US012484858B1

(12) United States Patent
Mathew et al.

(10) Patent No.: US 12,484,858 B1
(45) Date of Patent: Dec. 2, 2025

(54) SYSTEMS AND METHODS FOR A FOUNDATION MODEL FOR CARDIAC DATA

(71) Applicant: Eko Health, Inc., Emeryville, CA (US)

(72) Inventors: George Mathew, Berkeley, CA (US); John Prince, New York, NY (US); Daniel Barbosa, Newton Upper Falls, MA (US); Subramaniam Venkatraman, Lafayette, CA (US)

(73) Assignee: EKO HEALTH, INC., Emeryville, CA (US)

( * ) Notice: Subject to any disclaimer, the term of this patent is extended or adjusted under 35 U.S.C. 154(b) by 36 days.

(21) Appl. No.: 18/733,678

(22) Filed: Jun. 4, 2024

(51) Int. Cl.
*A61B 5/00* (2006.01)
*A61B 5/02* (2006.01)
*A61B 5/08* (2006.01)
*A61B 5/361* (2021.01)
*A61B 7/04* (2006.01)
*G16H 10/60* (2018.01)

(52) U.S. Cl.
CPC ........ *A61B 5/7267* (2013.01); *A61B 5/02028* (2013.01); *A61B 5/08* (2013.01); *A61B 5/361* (2021.01); *A61B 5/7221* (2013.01); *A61B 5/742* (2013.01); *A61B 7/04* (2013.01); *G16H 10/60* (2018.01); *A61B 2560/045* (2013.01); *A61B 2560/0468* (2013.01); *A61B 2562/0204* (2013.01); *A61B 2562/0219* (2013.01); *A61B 2562/225* (2013.01)

(58) Field of Classification Search
CPC ... A61B 5/7267; A61B 5/361; A61B 5/02028; A61B 5/08; A61B 5/7221; A61B 5/742; A61B 2560/045; A61B 2560/0468; A61B 2560/0204; A61B 2560/0219; A61B 2560/225; G16H 10/60
See application file for complete search history.

(56) References Cited

U.S. PATENT DOCUMENTS

| 2020/0046244 A1* | 2/2020 | Alam | G06N 3/045 |
| 2021/0345934 A1* | 11/2021 | Landgraf | A61B 5/6898 |
| 2023/0210471 A1* | 7/2023 | Zheng | A61B 5/08 600/301 |

(Continued)

OTHER PUBLICATIONS

Jin et al., Large Models for Time Series and Spatio-Temporal Data: A Survey and Outlook Journal of Latex Class Files, vol. 14, No. 8, Aug. 2021, p. 1-24 (Year: 2021).*

(Continued)

*Primary Examiner* — Amanda L Steinberg
(74) *Attorney, Agent, or Firm* — McCoy Russell LLP

(57) ABSTRACT

The present description relates generally to methods and systems for detecting cardiovascular conditions using a foundation model. In one example, a method includes obtaining a synchronized ECG signal and a PCG signal from a patient, converting the PCG signal to a PCG mel-spectrogram, entering the ECG signal and the PCG mel-spectrogram as input to a trained specialized model configured to output a classification output based on the ECG signal and the PCG mel-spectrogram, the trained specialized model trained with labeled ECG and PCG signal pairs using a foundation model trained with unlabeled ECG and PCG signal pairs, and storing the classification output in memory and/or displaying the classification output on a display device.

20 Claims, 8 Drawing Sheets

(56) References Cited

U.S. PATENT DOCUMENTS

2023/0329646 A1* 10/2023 Zhou ............... A61B 7/003

OTHER PUBLICATIONS

Ballas et al., "Listen2YourHeart: A Self-Supervised Approach for Detecting Murmur in Heart-Beat Sounds" Computing in Cardiology 2022; vol. 49, p. 1-4 (Year: 2022).*

"Foundation Model" from Wikipedia.org, archival version dated Apr. 10, 2024, and obtained Apr. 9, 2025. (Year: 2024).*

Dosovitskiy, A. et al., "An Image is Worth 16x16 Words: Transformers for Image Recognition at Scale," ArXiv Cornell University Website, Available Online at https://arxiv.org/abs/2010.11929, Available as Early as Oct. 22, 2020, Last Revised Jun. 3, 2021, 22 pages.

He, K. et al., "Masked Autoencoders Are Scalable Vision Learners," Proceedings of the 2022 IEEE/CVF Conference on Computer Vision and Pattern Recognition (CVPR), Jun. 18, 2022, New Orleans, Louisiana, 10 pages.

\* cited by examiner

SYSTEMS AND METHODS FOR A FOUNDATION MODEL FOR CARDIAC DATA

FIELD

The present description relates generally to methods and systems for training a foundation model for processing cardiac data, such as cardiac data captured by a digital stethoscope.

BACKGROUND/SUMMARY

Auscultation, the process of listening to internal sounds of a body, has historically been performed with an acoustic stethoscope. As one example, the acoustic stethoscope may include a two-sided chestpiece attached to hollow tubing that branches to two separate earpieces. A diaphragm on one side of the chestpiece may transmit high frequency sounds to the earpieces, or a bell on the other side of the chestpiece may transmit low frequency sounds to the earpieces. However, such acoustic stethoscopes are unable to digitize sounds that can be easily analyzed and shared electronically.

In contrast, an electronic (e.g., digital) stethoscope may generate digital audio data via an electronic chestpiece that may include components for noise amplification, digital display, sound and other biophysical signal recording (e.g., electrocardiogram (ECG) recording), and wireless signal transmission. For example, the electronic stethoscope may wirelessly transmit audio data to a listening device (e.g., a pair of headphones or hearing aids) or a computing device (e.g., a smartphone or laptop computer) via a wireless connection, such as a Bluetooth® connection.

The advent of digital stethoscopes has resulted in the collection of large volumes of physiological recordings of a variety of patients, such as ECG recordings and audio/phonocardiogram (PCG) recordings. These physiological recordings may be useful in training various models to automatically detect cardiovascular conditions such as atrial fibrillation.

However, the inventors herein have recognized potential issues with existing model training protocols. As one example, training traditional machine learning models such as convolutional neural networks requires large amounts of labeled training data. Labeling training data is time-consuming and frequently involves experts that may be difficult to find, and/or labeling training data may require invasive procedures to confirm a ground truth condition such as low ejection fraction. Further, in examples where invasive procedures are needed to confirm a ground truth condition, or in examples where the ground truth condition is relatively rare in the overall patient population, assembling sufficient training data to adequately train a model may be challenging and/or may bias the trained model due to an unrepresentative composition of the training data.

In one example, the issues described above may be addressed by a method, including obtaining an ECG signal and a PCG signal from a patient, wherein the ECG signal and the PCG signal are synchronized, converting the PCG signal to a PCG mel-spectrogram, entering the ECG signal and the PCG mel-spectrogram as input to a trained specialized model configured to output a classification output based on the ECG signal and the PCG mel-spectrogram, the trained specialized model trained with labeled ECG and PCG signal pairs using a foundation model trained with unlabeled ECG and PCG signal pairs, and storing the classification output in memory and/or displaying the classification output on a display device.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The present description relates generally to methods and systems for generating a foundation model trained to process synchronous electrocardiogram (ECG) and phonocardiogram (PCG) data. The foundation model may be used as a basis for one or more specialized models that are trained to detect physiological/cardiovascular conditions such as atrial fibrillation, low ejection fraction, murmur, pulmonary hypertension, and the like from synchronous ECG and PCG data. The synchronous ECG and PCG data may be obtained using digital stethoscopes. For example, a digital (e.g., electronic) stethoscope may be the electronic stethoscope shown in FIGS. 1A-1B having a chestpiece as shown in FIG. 1B that contains electrical components of the electronic stethoscope, including components for recording synchronous ECG and PCG data and transmitting the synchronous ECG and PCG data to one or more computing devices. As shown in FIG. 2, the synchronous ECG and PCG data may be stored in a database of a foundation model system and eventually used by a data processing system to train a foundation model, according to the process shown in FIG. 3 and the method illustrated in FIG. 5. Some synchronous ECG and PCG data may be labeled (e.g., by an expert) and used, by the system of FIG. 2, to fine-tune the trained foundation model into a specialized model, as shown by the process of FIG. 4 and the method illustrated in FIG. 6. Once a specialized model is generated, the specialized model may be deployed in the system of FIG. 2 to identify a patient condition, according to the method illustrated in FIG. 7.

In this way, the synchronized ECG and PCG data, most of which may be unlabeled, may be used to train the foundation model to learn associations between features of ECG and PCG data in an unsupervised manner. The trained foundation model may then in turn be used as the basis for one or more specialized models that are each trained to discriminate between normal and abnormal states for one or more patient conditions, such as atrial fibrillation, murmur, pulmonary hypertension, or low ejection fraction. In doing so, the foundation model may take advantage of available unlabeled training data (e.g., ECG and PCG pairs) to learn associations between features of the ECG data and the PCG data as well as associations among features of the ECG data and associations among features of the PCG data and generate output that describes such associations. The specialized model may learn to map those associations to normal and abnormal states of a patient condition using a smaller set of labeled training data. As such, specialized models that can identify patient conditions that otherwise may demand invasive procedures to detect or are generally unreliably detected via standard techniques (such as auscultation by a clinician) may be generated with a relatively small amount of labeled training data.

Figure 1A:
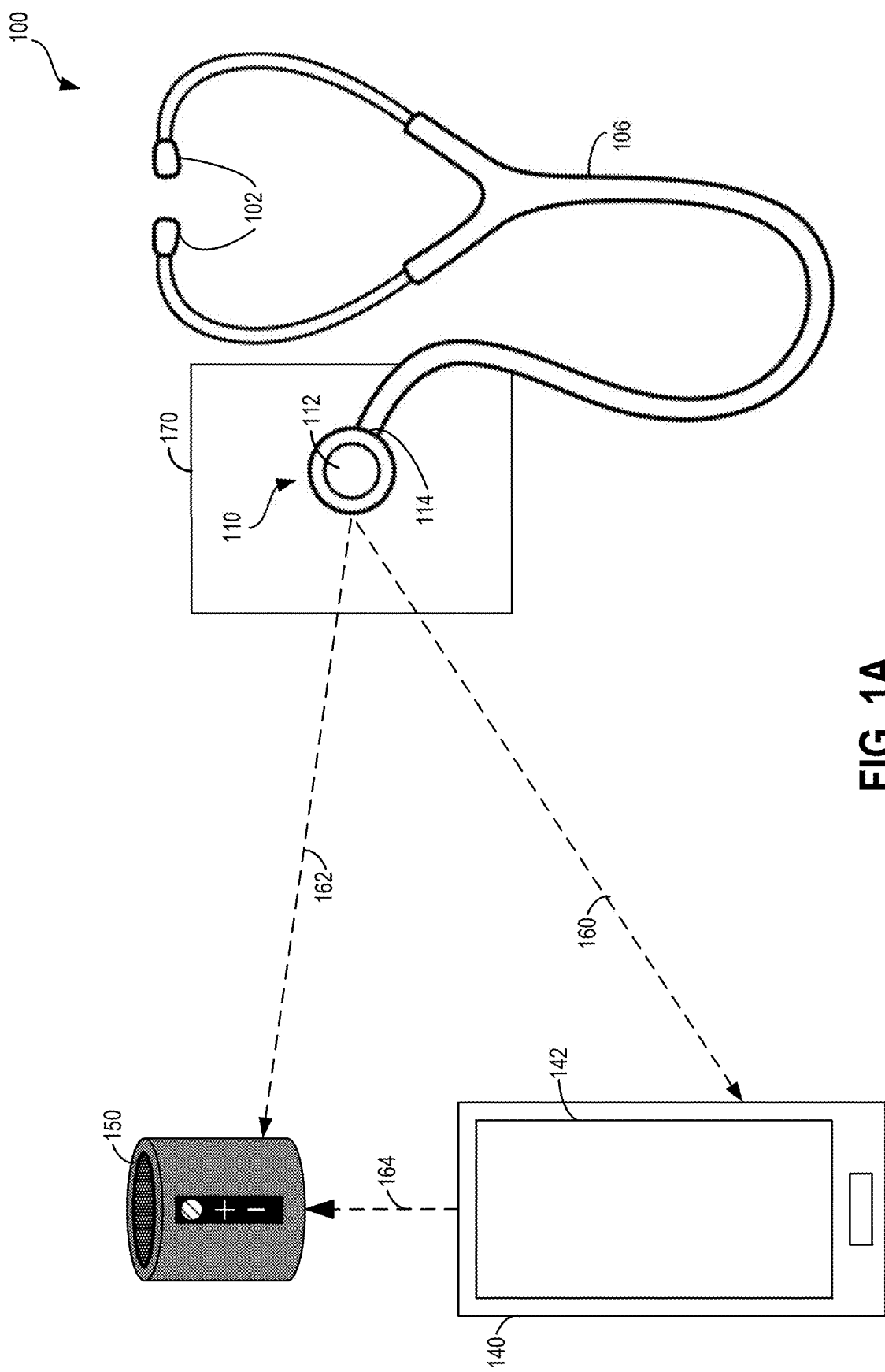
FIG. 1A is a schematic drawing showing an example digital stethoscope including earpieces connected to a chestpiece.
Figure 1B:
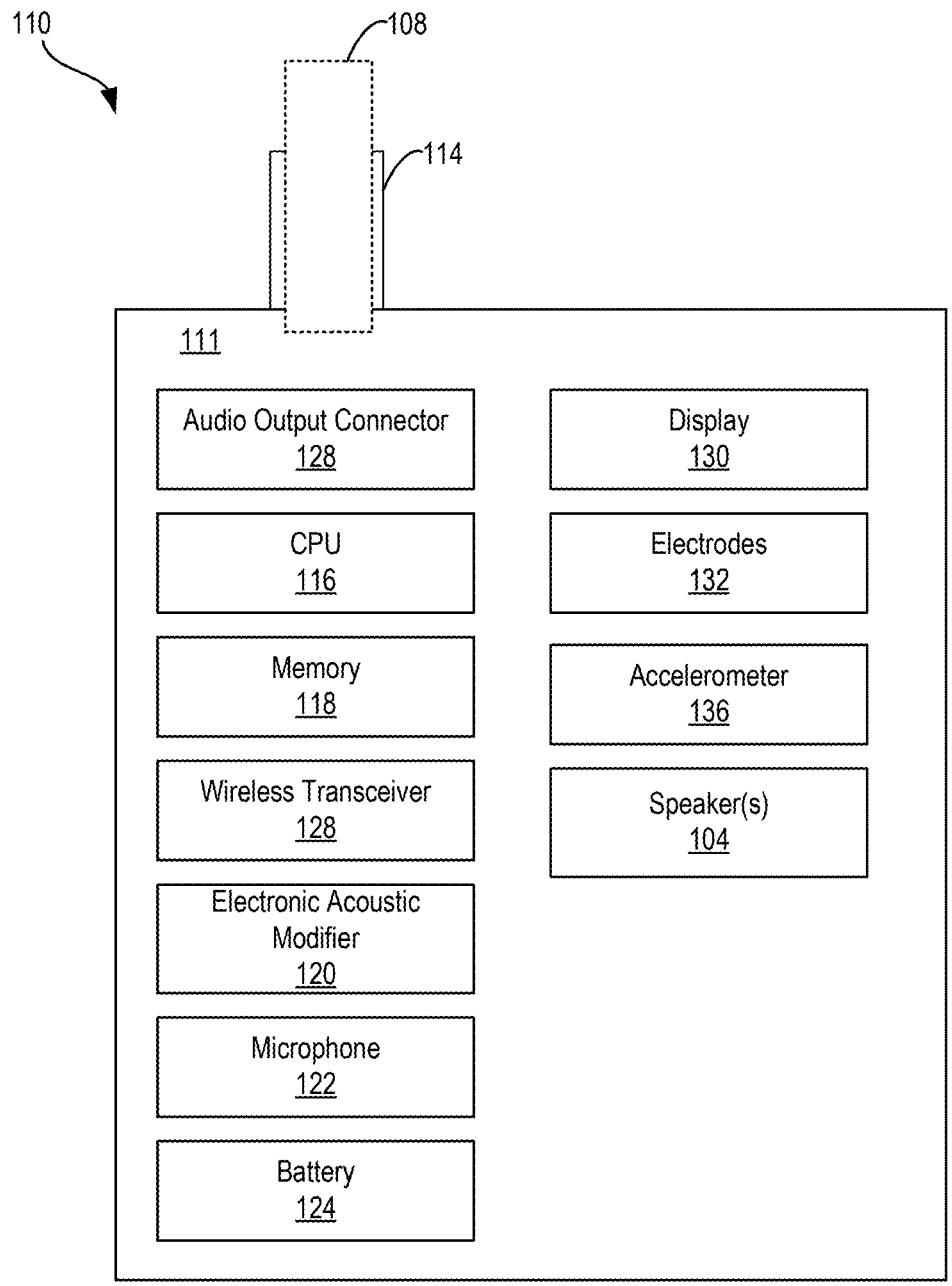
FIG. 1B is a block diagram showing the components of the chestpiece shown in FIG. 1A.
Figure 2:
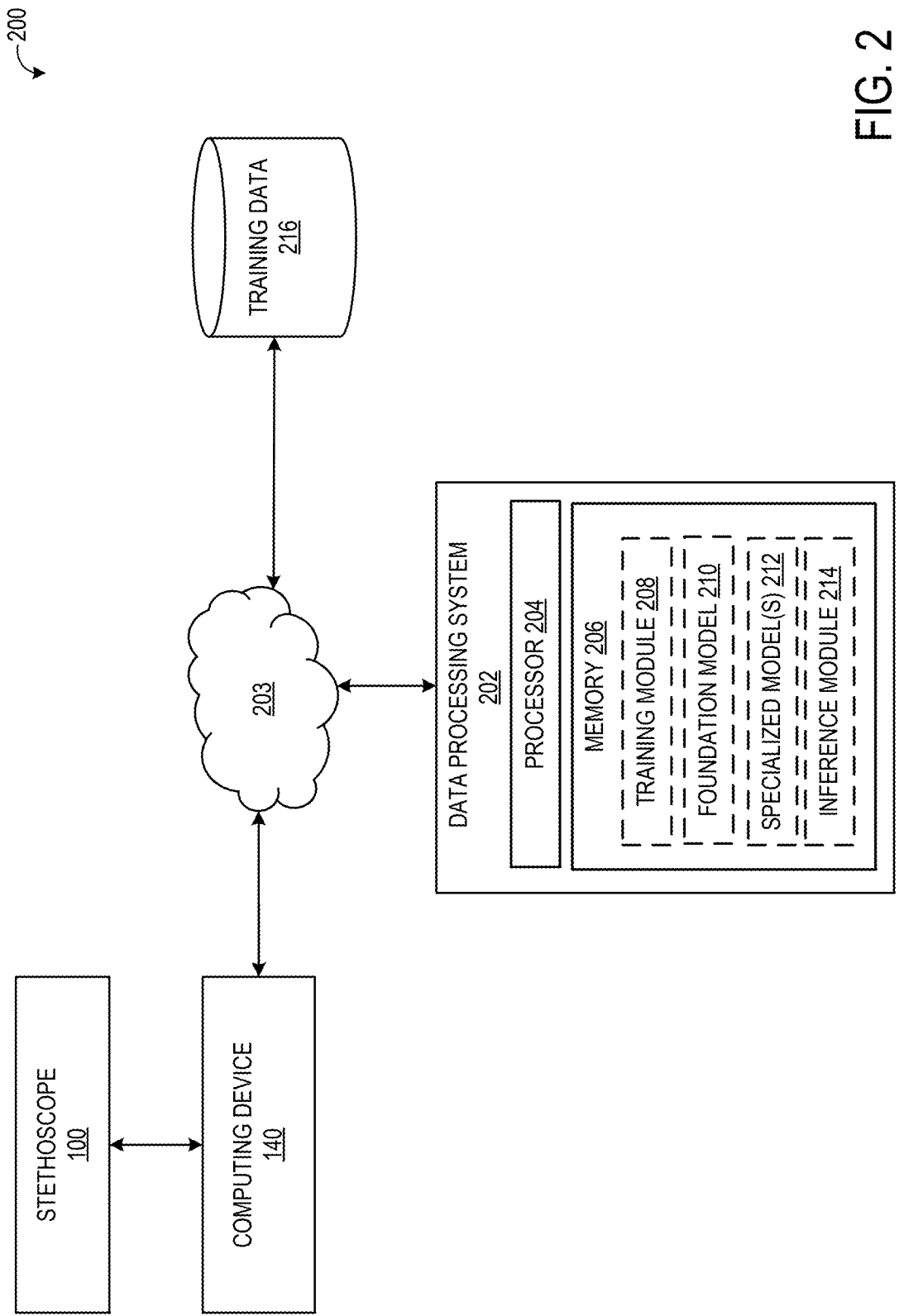
FIG. 2 is a block diagram of an example foundation model system for training and/or deploying specialized models from a foundation model.

Turning now to the figures, FIGS. 1A and 1B show an electronic stethoscope 100 that may be used to collect synchronized ECG and PCG recordings of a patient. The electronic stethoscope 100 shown in FIGS. 1A and 1B is one example of an electronic stethoscope that may be used to collect synchronized ECG and PCG recordings and transmit the synchronized ECG and PCG recordings to an external computing device for further processing as disclosed herein. It is to be appreciated that other electronic stethoscopes that are configured to collect ECG and PCG recordings may be used without departing from the scope of this disclosure.

Referring first to FIG. 1A, the electronic stethoscope 100 includes a chestpiece 110 and an output tube 106. The chestpiece 110 is in electronic communication with the output tube 106 through a connector 114 of the chestpiece. The output tube 106 includes earpieces 102 configured to be positioned in ears of a wearer to project recorded physiological sounds to the wearer. The output tube 106 and earpieces 102 may form a headset.

The chestpiece 110 may include a diaphragm 112, which is a sealed membrane with air inside that vibrates from external noises. The diaphragm 112 moves a volume of air inside the chestpiece 110 according to the vibrations caused by the external noises, which in turn creates sounds that may be recorded and transmitted through the connector 114 to the output tube 106. In some examples, the chestpiece 110 may include a bell in addition to the diaphragm 112. When included, the bell may be an open hollow cup or may include a smaller sealed membrane than the diaphragm 112, and air inside the bell may vibrate from external noises to produce acoustic pressure waves. The diaphragm 112 may be used for higher frequency auscultation, such as heart beats and breath sounds, while the bell may be used for lower frequency auscultation, such as heart murmurs and bowel sounds. The chestpiece 110 may be placed on a patient (e.g., subject) 170 by the patient 170 or by a clinician (not shown) for auscultation. The clinician or the patient 170 may listen to bodily sounds produced by the patient through the earpieces 102.

In some examples, the digital stethoscope includes one or more speakers to transmit amplified audio to a user's ears. The one or more speakers may be positioned in the chestpiece 110, in the output tube 106, or at the earpieces 102. Additional detail about the one or more speakers is provided below with respect to FIG. 1B.

The chestpiece 110 may connect to other electronic devices through wireless connections. For example, the chestpiece 110 may connect to an external computing device 140 through a first wireless connection 160. The external computing device 140 may be a mobile device, such as a smartphone, a tablet, a smartwatch, a laptop computer, or a personal digital assistant (PDA), for example. Alternatively, the external computing device 140 may be a stationary device, such as a desktop computer or server. In still other examples, the external computing device 140 may be included in a computing network, such as a cloud computing network. The external computing device 140 may include a processor operatively connected to memory (such as random-access memory, read-only memory, flash memory, a hard disk, etc.) as well as a communications interface for sending/receiving wired or wireless signals from a network and/or other computing devices, including the chestpiece 110. Further, the external computing device 140 includes a user interface 142, such as a display for outputting information to a user and one or more of a touchscreen, a trackball, hard keys/buttons, a keyboard, a mouse, and a trackpad for receiving user inputs. The external computing device 140 may operate a software application that receives the user inputs via the user interface 142 to adjust operation of the chestpiece 110. By connecting wirelessly to the external computing device 140, the chestpiece 110 may send audio data, ECG data, and/or other physiological data (e.g., accelerometer data) to the external computing device 140.

As another example, the chestpiece 110 may connect to an external listening device 150 through a second wireless connection 162, and sounds recorded by the chestpiece 110 may be projected by the external listening device 150 for the patient 170 or the clinician to hear. The external listening device 150 may be a speaker, headphones, earbuds, hearing aids, or another device capable of projecting sound and forming wireless connections to other devices. In some examples, the external computing device 140 may connect to the external listening device 150 through a third wireless connection 164 instead of the chestpiece 110 connecting directly to the external listening device 150. In such examples, recorded sounds may be sent from the chestpiece 110 to the external computing device 140 and from the external computing device 140 to the external listening device 150.

As will be elaborated below with respect to FIG. 1B, the chestpiece 110 includes components for recording and sharing auscultations. Additionally, in some examples, the chestpiece 110 may include components for recording and sharing electronic signals of a heart (e.g., electrocardiogram signals). Further, in some examples, the chestpiece 110 may be disconnected from the output tube 106 and the earpieces 102.

Continuing to FIG. 1B, in some examples, the chestpiece 110 includes a body 111 that houses internal components, examples of which are elaborated below. The chestpiece 110 includes a computer processing unit (CPU) 116, such as a microcontroller unit (MCU), positioned within the body 111. The CPU 116 receives inputs and/or sends outputs to various electronic components that will be described further herein. In some examples, there is one microdevice that contains the CPU 116 and some or all of the electronic and electrical components. In some arrangements, the CPU 116 and the electronic and electrical components are positioned on two or more microdevices. The CPU 116 is operatively coupled to a memory 118, which includes one or more of a non-transitory (e.g., read-only) memory, a keep alive memory, and a random-access memory.

The chestpiece 110 may include an electronic acoustic modifier 120 in electrical communication with the CPU 116. In some examples, the electronic acoustic modifier 120 is a stand-alone device. In other examples, the electronic acoustic modifier 120 is firmware within the CPU 116. The electronic acoustic modifier 120 is configured to receive an auscultated electronic signal from a microphone 122 (e.g., the signal output by the microphone 122, which includes vibrations of the volume of air generated by the diaphragm during auscultation), modify the auscultated electronic signal to form a modified electronic signal (e.g., amplify the electronic signal), and transmit the modified electronic signal to one or more speakers 104 configured to convert the modified electronic signal to sound output. The auscultated electronic signal captured by the microphone 122 may be visually represented as a phonocardiogram (PCG) signal that can be transmitted to one or more external devices, as explained below.

The one or more speakers 104 may be positioned in the chestpiece 110, as shown. In such examples, the one or more speakers 104 may convert the electronic signal (e.g., received from the electronic acoustic modifier 120) to a sound output that is transmitted to a user's ears via the output tube 106 and earpieces 102. In other examples, the one or more speakers may be positioned elsewhere, such as within the output tube 106 or within the earpieces 102. Further, the speaker(s) 104 may be automatically powered on when the electronic stethoscope 100 is operated in an internal (e.g., wired) digital mode and automatically powered off when the electronic stethoscope 100 is operated in a wireless digital mode.

The chestpiece 110 includes an optional audio output connector 126, such as a headphone jack or USB-type port, which can receive the modified electronic signal from the electronic acoustic modifier 120. A user may physically connect a peripheral device to the audio output connector 126. Examples of such peripheral devices include but are not limited to a computer, a cell phone, and a listening device configured to convert the modified electronic signal to sound. The audio output connector 126 may also act as a charging port in order to charge battery 124 of chestpiece 110.

In some examples, a wireless transceiver 128 is positioned in the chestpiece 110, such as within the body 111, as shown. In some examples, the wireless transceiver 128 may be included in a circuit board, such as a printed circuit board (PCB), that may also include one or more electronic components, such as the microphone 122 and the CPU 116. The wireless transceiver 128 is in electrical communication with the electronic acoustic modifier 120. The wireless transceiver 128 is configured to receive the modified electronic signal from the electronic acoustic modifier 120, convert the modified electronic signal to a modified wireless signal, and wirelessly transmit the modified wireless signal from the chestpiece to an external listening device, such as the external listening device 150 shown in FIG. 1A, and/or a peripheral device, such as external computing device 140 shown in FIG. 1A. The wireless transceiver 128 may use any appropriate communication types and protocol, such as television, cellular phone, Wi-Fi, satellite, two-way radio, infrared, short-range microwave signals, IEEE 802.11 compliant radio signals, Bluetooth®, or Low Energy Bluetooth (BLE). In some examples, the wireless transceiver 128 may be configured to pair directly to the external listening device 150 and/or the external computing device 140. Alternatively, the wireless transceiver 128 may communicate data to the external listening device 150 and/or the external computing device 140 through an intermediary device, such as a wireless router maintaining a local area network (WLAN) or through a connection to the internet. The wireless transceiver 128 may also be configured to receive signals from one or more peripheral devices, including the external computing device 140 shown in FIG. 1A. In some examples, the wireless transceiver 128 is in electrical communication with the microphone 122, and can wirelessly transmit the auscultated electronic signal to the external listening device 150 and/or the external computing device 140 without modification of the electronic signal via the electronic acoustic modifier 120. In some examples, the chestpiece 110 may include a second wireless transceiver that may thereby allow the chestpiece to establish two separate wireless connections with external devices. For example, the wireless transceiver 128 may connect to the external computing device 140 while the second wireless transceiver connects to the external listening device 150.

It may be understood that sound may be projected via the speaker(s) 104 and also transmitted via the wireless transceiver 128 at the same time. For example, a user (e.g., a clinician or the patient 170) may listen to physiological sounds while placing the electronic stethoscope on the patient 170 via the earpieces 102 while one or more remote clinicians listen simultaneously via the external listening device 150.

In some examples, the auscultated electronic signal or the modified electronic signal may be analyzed on the chestpiece 110 by the CPU 116. In some examples, the auscultated electronic signal or the modified electronic signal may be transmitted by the wireless transceiver 128 or through the audio output connector 126 to the external listening device 150 and/or the external computing device 140. Such signals (e.g., PCG signals) can then be analyzed on the external computing device 140 to extract information about the condition of the patient or to suggest the preliminary diagnosis. The results of such an analysis can be transmitted back to the wireless transceiver 128 and can be communicated to a user of the electronic stethoscope 100 visually or with sound. Visual information can be provided using via a display screen 130 of the chestpiece 110. Sound may be in the form of beeps, tones, or voice transmitted through the speakers 104 or the external listening device 150. The external listening device 150 may be wireless headphones, a hearing aid, or a wireless speaker, for example, that is not included within the electronic stethoscope 100.

In some examples, the chestpiece 110 includes a second microphone facing the external environment. The second microphone is configured to detect audio from the external environment and to convert the audio into an electronic signal. In some examples, one or both of the microphone 122 and the second microphone is a micro-electrical-mechanical system (MEMS) microphone, an electret microphone, or a piezoelectric microphone. When such a second microphone is included in the chestpiece, the electronic acoustic modifier 120 is configured to receive the electronic noise signal from the second microphone and to use the electronic noise signal, for example, as part of active noise cancellation, in modifying the auscultated electronic signal to form the modified electronic signal.

In some examples, the second microphone can detect that the microphone 122 is recording sounds from "open air," such as when the chestpiece 110 is held against the air, by comparing the signals coming from the two microphones. If the signals are highly correlated, the sounds that would otherwise be transmitted to the speaker(s) 104 and/or the external listening device may be suppressed. This would prevent amplification of sounds when the chestpiece 110 is not on a patient and could prevent accidental exposure to undesirable amplified sounds from such things as sirens, speech, doors closing, etc. If the two microphones detect significantly different sounds, it is an indication that the chestpiece 110 may be on a surface intended to be auscultated, and amplification could be employed.

It should be understood that, in describing electrical communication, the phrase, "A is in electrical communication with B," describes both direct electrical communication from A and B or from B and A and also electrical communication that goes between A to B through the CPU 116, (e.g., from A to the CPU 116 to B and from B to the CPU 116 to A).

Chestpiece 110 further includes a battery 124. The battery 124 may be a disposable battery or a rechargeable battery. If the battery 124 is a disposable battery, the outside of the chestpiece may include a door (not shown) through which the battery 124 can be changed. If the battery 124 is a rechargeable battery, the outside of the chestpiece may include a charging port (as explained above) through which the battery 124 can be charged. Alternatively, the battery 124 may be charged wirelessly. The battery 124 is configured to supply power to the electronic components of the chestpiece, including, but not limited to, the microphone 122, the electronic acoustic modifier 120, the second microphone (when included), the speaker(s) 104, the CPU 116, the wireless transceiver 128, and the display screen 130.

Chestpiece 110 may also include one or more display outputs (not shown) positioned on an exterior of the chestpiece 110, such as indicator lights. In some examples, the display screen 130 configured to display text and/or images may also be included as a display output. The indicator lights and/or the display screen may provide information about the state of the electronic stethoscope 100 and/or provide information about the condition of the patient.

In some examples, the chestpiece 110 includes one or more devices to provide audio indicator signals (not shown) to provide sounds, such as beeps or verbal language, to indicate device operation status and/or information about the condition of the patient. In some examples, the volume of the audio indicator can be adjusted or turned off through user inputs.

In some examples, the body 111 of the chestpiece 110 may be connected to the output tube 106 shown in FIG. 1A via a connector 108 of the output tube 106 that is configured to be positioned within connector 114 of the chestpiece 110. In some examples, connector 108 and connector 114 may enable electrical connection between signal wires in the output tube 106 and the electrical components of the chestpiece 110 (e.g., the electronic acoustic modifier 120). In other examples, the connector 108 may facilitate an acoustic connection between speaker(s) 104 in the chestpiece 110 and the output tube 106 and earpieces 102. Thus, the connector 114 may house connector 108 in order to mechanically and acoustically couple the earpieces 102 to the chestpiece 110. The connector 108 may be integrated with (e.g., part of) the output tube 106 or may be a separate fitting.

In some examples, one or more feedback signals may be used to determine whether or not the output tube 106/earpieces 102 are physically connected to the chestpiece 110. For example, the CPU 116 may receive feedback from a component in the earpieces 102, such as a sensor and/or the speakers 104. For example, the sensor and/or the speakers 104 in the earpieces 102 may be selectively powered when the earpieces 102 are coupled to the body 111 via the connector 114 and connector 108, whereas electronic communication between the sensors and/or the speakers 104 and the chestpiece 110 is discontinued while the earpieces 102 are disconnected from the body 111. In another example, a switch or a proximity sensor may be used to determine whether or not the earpieces 102 are connected based on detecting that the connector 108 has been inserted within connector 114 or based on a distance from the earpieces 102 from the chestpiece 110. In some examples, the CPU 116 may select an operating mode of the electronic stethoscope 100 based on whether the output tube 106 is connected to the chestpiece 110 (e.g., wireless only or wired) in order to adjust operation of the speakers 104 and/or electronic acoustic modifier 120.

The chestpiece 110 may include two or more electrodes 132 that may be used to obtain electrocardiogram (ECG) signals of the patient 170. The electrodes 132 are physically separated from one another to facilitate measurement of electrical signals on a patient's skin resulting from depolarization of the patient's heart muscle during each heartbeat, when appropriately positioned, e.g., against a patient's chest on the patient's left pectoral region. The chestpiece 110 may include an analog-to-digital converter to digitize voltage differentials measured by electrodes 132, as well as signal processing circuitry to filter and condition the detected signals. ECG signal processing circuitry may be implemented in the analog domain (e.g., prior to digitization), in the digital domain e.g., by CPU 116 and/or a dedicated digital signal processing integrated circuit), or both. The ECG signals obtained with the electrodes 132 may be sent to external computing device 140 via wireless transceiver 128. The ECG data may comprise single-lead ECG data. Single-lead ECG data may be obtained from one electrode that may be a ground and another electrode that may be a signal electrode. A voltage difference between the leads may comprise analog ECG signal data. ECG data can be recorded as voltage as a function of time. Alternatively, the ECG data may comprise three-lead ECG data. In still other examples, the ECG data may be obtained via more than three leads (e.g., five-lead ECG data). For example, the ECG electrodes may have between 1 and 12 leads, each capturing different vectors of the electrical polarization of the heart. As such, the ECG electrodes may capture between 1 to 12 different vectors of the electrical polarization of the heart, depending on the number of leads.

In some examples, the chestpiece 110 may include an accelerometer 136. The accelerometer 136 may comprise a three-axis accelerometer, which may provide information about the orientation and motion of the chestpiece 110. The accelerometer 136 may be rigidly affixed to a surface within the chestpiece 110 so that the accelerometer does not move independently from the chestpiece 110 as a whole. The accelerometer may be used to calculate an orientation of the chestpiece 110 when the chestpiece 110 is held stationary by a user. In some examples, the motion (or lack thereof) of the chestpiece 110 measured by the accelerometer 136 may be used to adjust the state of the electronic stethoscope, such as activating/powering on the electronic stethoscope when the accelerometer output indicates that the chestpiece 110 has been picked up by the user or by deactivating/powering off the electronic stethoscope when the accelerometer output indicates the chestpiece 110 has been stationary for a threshold duration. In still further examples, the accelerometer 136 may be used to record seismocardiogram (SCG) data corresponding to lower frequency oscillations (e.g., less than 50 Hz) of the chest wall of the subject and/or the data captured by the accelerometer 136 may be used to determine motion of the patient and/or the chestpiece 110 during recording of the audio and ECG data.

FIG. 2 shows a foundation model system 200 including a data processing system 202, in accordance with one or more embodiments of the disclosure. Data processing system 202 may be communicatively coupled (e.g., via a network, such as network 203) to one or more databases storing training data 216 as well as computing device 140 (e.g., of FIG. 1A). Computing device 140 is an example computing device and data processing system 202 may be communicatively coupled to a plurality of computing devices that are similar to computing device 140. Computing device 140 may receive synchronized ECG and PCG recordings of a plurality of patients from one or more stethoscopes, such as stethoscope 100. At least in some examples, the stethoscopes used to collect the synchronized ECG and PCG recordings may be handheld devices that include an audio sensor (e.g., microphone) to capture the PCG signal and an ECG sensor (e.g., two or more electrodes) to capture the ECG signal at the same time the PCG signal is captured, with the audio sensor and the ECG sensor at least partially encased in a housing of the handheld device and included at fixed positions relative to each other. The synchronized ECG and PCG recordings may be stored in the one or more databases as the training data 216. As explained above, stethoscope 100 is a non-limiting example of a device that may be used to capture the synchronized ECG and PCG signals/recordings, and other stethoscopes or medical devices may likewise be used to capture ECG and PCG signals that are stored in the one or more databases. However, utilizing handheld stethoscopes like stethoscope 100 may have advantages in that the ECG signal and PCG signal are automatically synchronized during signal acquisition and further processing to determine if the signals are synchronized and/or synchronize the signals may not be performed. Further, due to the handheld nature of stethoscope 100 and other similar stethoscopes, a variety of ECG/PCG signals captured at different locations (e.g., relative to a heart/lungs) on different patients and at different quality levels may be stored in the one or more databases as the training data 216. Additionally, some of the training data 216 may include single-lead ECG signals while other training data 216 may include multi-lead ECG signals (e.g., 3-lead, 5-lead), at least in some examples.

Thus, the training data 216 may include synchronized ECG and PCG recordings from a plurality of patients, including normal patients (e.g., patients not exhibiting one or more cardiovascular conditions) and patients that exhibit one or more cardiovascular conditions. The majority of the ECG and PCG recordings stored as the training data 216 in the one or more databases may be unlabeled. As used herein, "unlabeled" may indicate that the ECG recording or PCG recording does not include a label or annotation that identifies the ECG recording or PCG recording as being normal, abnormal, or otherwise suggestive of a particular patient condition. Some of the training data 216 may include labeled ECG and PCG recordings. As used herein, "labeled" may indicate that the ECG recording or PCG recording does include a label or annotation that identifies the ECG recording or PCG recording as being normal, abnormal, and/or otherwise suggestive of a particular patient condition. Further, some of the training data 216 may include quality labels that indicate the quality level (e.g., high or poor, on a scale of 1-5 or 1-10, or high, intermediate, or poor) of the corresponding ECG signal and/or PCG signal. The quality labels may be generated by experts or generated automatically based on output from the accelerometer of the stethoscope that captured the corresponding ECG signal and PCG signal (e.g., which may indicate whether or not the stethoscope was moving during signal capture). In some examples, some training data may be labeled with both quality labels and patient condition labels.

Data processing system 202 includes a processor 204 configured to execute machine readable instructions stored in non-transitory memory 206. Processor 204 may be single core or multi-core, and the programs executed thereon may be configured for parallel or distributed processing. In some embodiments, processor 204 may optionally include individual components that are distributed throughout two or more devices, which may be remotely located and/or configured for coordinated processing. In some embodiments, one or more aspects of processor 204 may be virtualized and executed by remotely-accessible networked computing devices configured in a cloud computing configuration.

Non-transitory memory 206 may store a training module 208, a foundation model 210, one or more specialized models 212, and an inference module 214. In some examples, non-transitory memory 206 further stores processed and/or unprocessed ECG and PCG recordings obtained from the one or more databases storing the training data 216 and/or directly from the computing device 140. For example, during training of the foundation model 210, unprocessed (and unlabeled) ECG and PCG recordings may be obtained from the one or more databases and stored (e.g., temporarily) in memory 206 to facilitate training and validation of the foundation model 210, as will be explained in more detail below. As another example, during training of one of the specialized models 212, unprocessed (though labeled) ECG and PCG recordings may be obtained from the one or more databases and stored (e.g., temporarily) in memory 206 to facilitate training and validation of the specialized model, as will also be explained in more detail below.

Training module 208 may comprise instructions for training foundation model 210. Training module 208 may include instructions that, when executed by processor 204, cause data processing system 202 to conduct one or more of the steps of method 500 of FIG. 5 for training foundation model 210. Further, training module 208 may comprise instructions for training the one or more specialized models 212. Training module 208 may include instructions that, when executed by processor 204, cause data processing system 202 to conduct one or more of the steps of method 600 of FIG. 6 for training the one or more specialized models 212.

Inference module 214 may include instructions for deploying the one or more specialized models 212 to identify a given patient condition for a patient based on ECG and PCG recordings of the patient. In particular, inference module 214 may include instructions that, when executed by processor 204, cause data processing system 202 to conduct one or more of the steps of method 700 of FIG. 7. However, in some examples, additionally or alternatively, the one or more specialized models 212, when trained and validated, may be deployed on other devices, such as computing device 140. In such examples, the one or more specialized models 212 and inference module 214 may additionally or alternatively be stored on the other devices (e.g., computing device 140).

Figure 3:
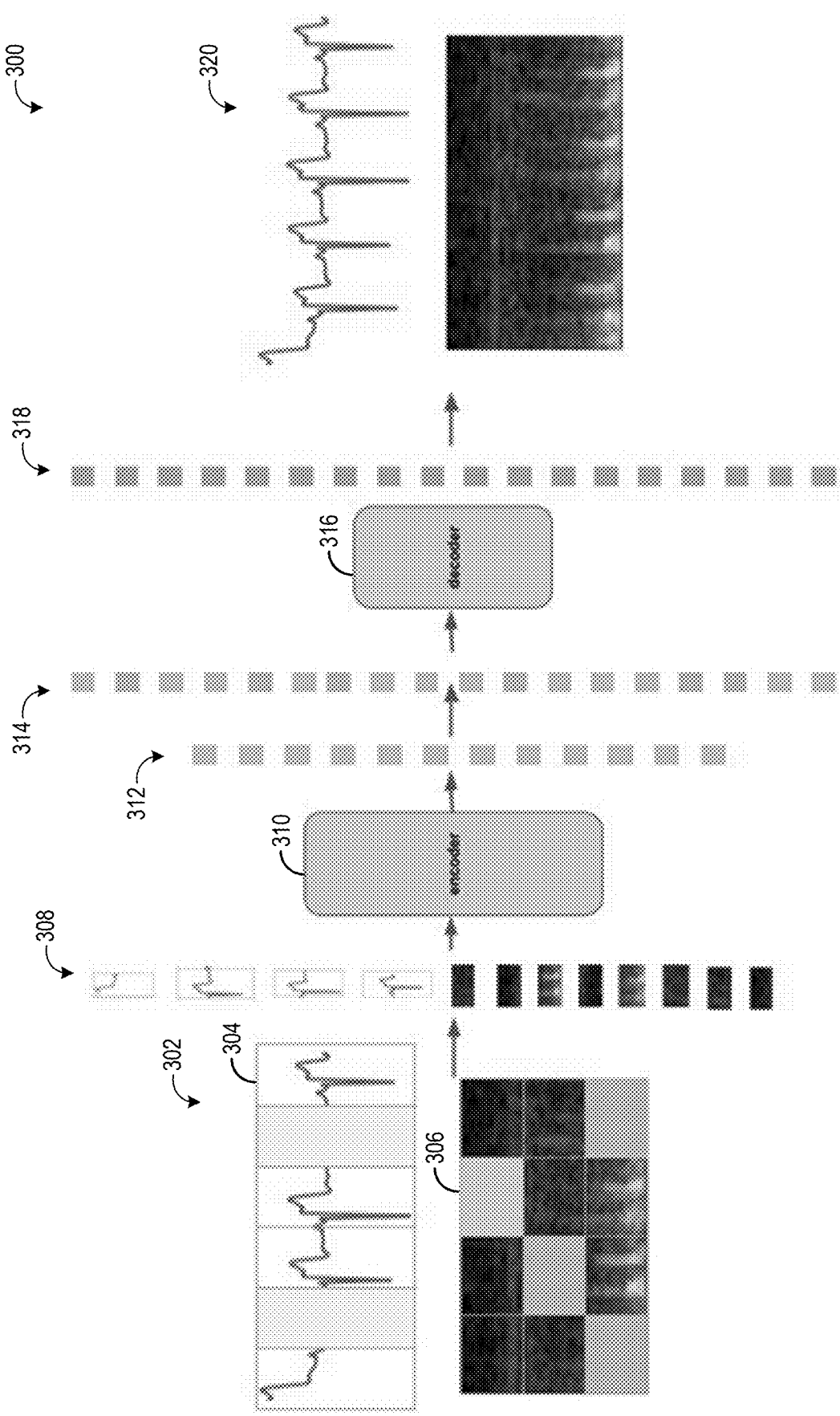
FIG. 3 is a block schematic diagram illustrating an example process for training the foundation model using the system of FIG. 2.
Figure 4:
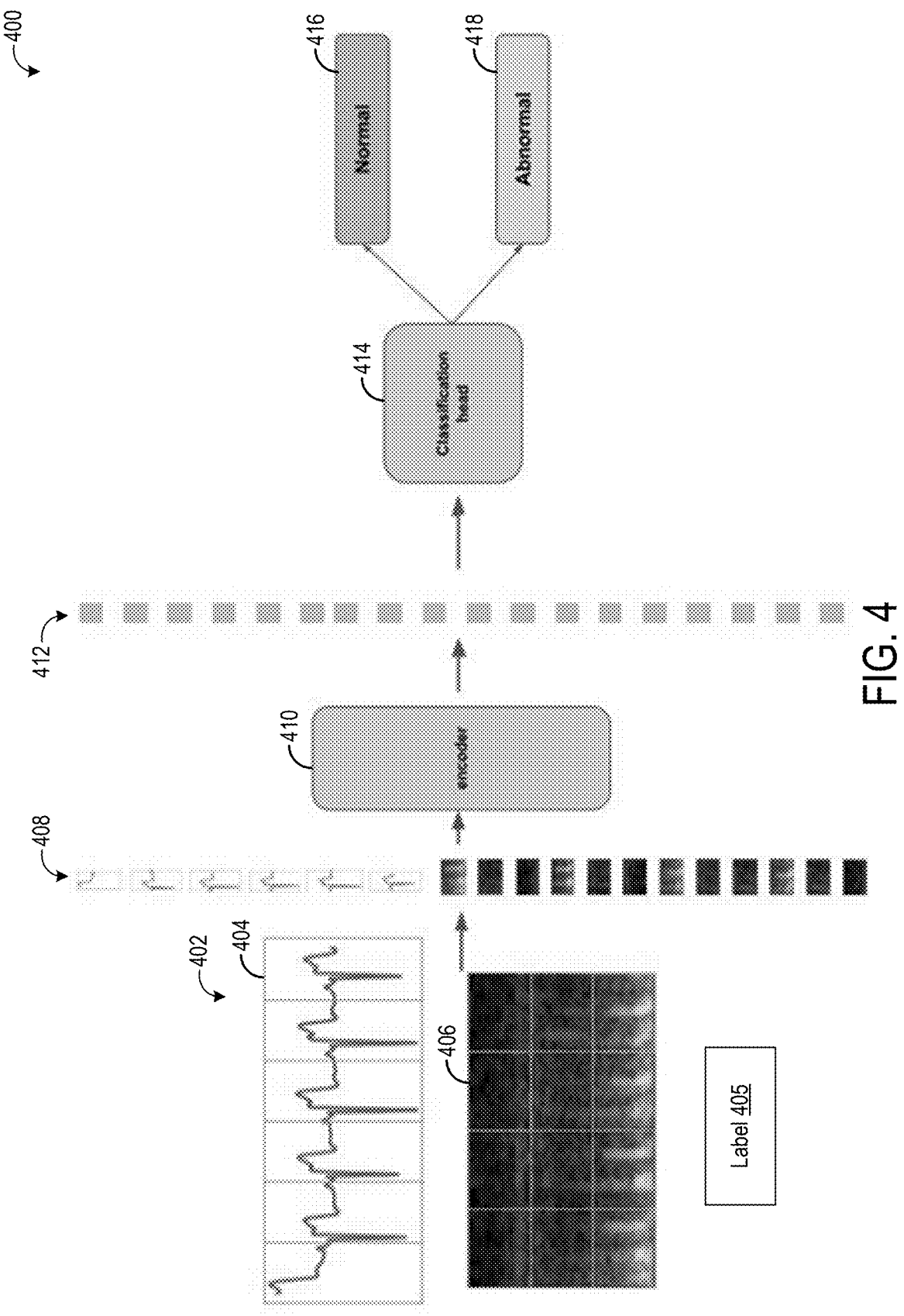
FIG. 4 is a block schematic diagram illustrating an example process for training a specialized model from the trained foundation model of FIG. 3.

FIG. 3 schematically shows an example process 300 for training a foundation model according to embodiments of the present disclosure. Process 300 may be carried out by data processing system 202 using training data 216 according to instructions stored in training module 208. Process 300 includes processing of the training data to form training data input sets. FIG. 3 shows an example of a training data input set 302. The training data may include a plurality of pairs of unlabeled, synchronized ECG and PCG signals. Each pair of unlabeled, synchronized ECG and PCG signals may be collected with a stethoscope (e.g., stethoscope 100) and the ECG signal and PCG signal in a given ECG-PCG pair may be collected from the same patient at the same time. Each PCG signal may represent sound produced by the patient as amplitude over time and each ECG signal may represent electrical signals produced by the patient as voltage over time.

The processing may include converting each PCG signal into a mel-spectrogram representation. The mel-spectrogram representation may be a spectrogram of the PCG signal (e.g., showing signal strength over time at various frequencies) where the frequencies are on the mel scale. Mel-spectrograms provide compact representations of the audio data (e.g., PCG data) and yet capture the important features for mimicking human perception. Also, mel-spectrograms may be more robust to noise compared to raw PCG signals. Further, representing the collected audio data as a mel-spectrogram rather than raw PCG forces the foundation model to explicitly learn associations across frequency contents during different parts of the cardiac cycle. The processing may further include partitioning each (one-dimensional) ECG signal into segments and partitioning each (two-dimensional) PCG mel-spectrogram into patches. Further, the processing may include randomly masking segments of each ECG signal and randomly masking patches of each PCG mel-spectrogram.

As shown in FIG. 3, the training data input set 302 may include an ECG signal 304 and a PCG mel-spectrogram 306 (FIG. 3 shows a grayscale representation of the PCG mel-spectrogram, which typically would include color). The ECG signal 304 may have a specified duration (e.g., 5 seconds) and may be partitioned into equal segments (e.g., 25 segments each 0.2 seconds long). In the example shown, two of the segments are masked (shown in gray), though the number of segments that are masked may depend on a target masking ratio and the number of segments. For example, a target masking ratio for the ECG signal may be 30% and thus for an ECG signal segmented into 25 segments, 8 or 9 segments may be masked. The PCG mel-spectrogram 306 may correspond to a PCG signal with the same duration as the ECG signal (e.g., 5 seconds) and may be partitioned into equal patches (e.g., patches of 16×16 pixels). In the example shown, four of the patches are masked (shown in gray), though again the exact number of masked patches may depend on the size of the PCG mel-spectrogram (e.g., number of pixels) and target masking ratio for the PCG mel-spectrogram (which may be the same or different than the target masking ratio for the ECG signal). It is to be appreciated that the ECG signal may be partitioned into segments where each segment spans a different time range and includes the entire ECG signal over that time range while the PCG mel-spectrogram may be partitioned into patches where each patch includes a portion of the mel-spectrogram frequency range over a time range. For example, the PCG mel-spectrogram may be partitioned into patches arranged in rows and columns (e.g., three rows of patches with four patches in each row). In this way, different patches may include different frequency ranges as well as different time ranges. The percentage of the ECG segments that are masked and the percentage of the PCG mel-spectrogram patches that are masked may be the same, or the percentages may be different. In a non-limiting example, the percentage of ECG segments that are masked (e.g., the target masking ratio for the ECG signal) may be 30% while the percentage of the PCG mel-spectrogram patches that are masked (e.g., the target masking ratio for the PCG mel-spectrogram) may be 70%. The target masking ratios may be determined empirically based on the performance of the foundation model for downstream tasks (e.g., predicting if a patient is normal or abnormal for a given cardiac condition).

The foundation model may be a transformer-based model that includes an encoder part (encoder 310) and a decoder part (decoder 316). The training data input set 302 is used to train the encoder 310 and decoder 316. However, only the unmasked segments and patches of the training data input set 302 are processed via the encoder 310. Thus, the training data input set 302 is processed into an input sequence 308 that includes only the unmasked segments and patches of the training data input set 302, and the masked segments/patches are removed (and no mask tokens are included). Positional encodings may be used to indicate a position of the masked segments within the training data input set 302. In some examples, the positional encodings may be positional embeddings that are learned during training of the foundation model. In other words, the encoder 310 may be configured to generate the latent presentations or encodings of the subset of tokens from the training data input set 302. The positional embeddings may be separate for the ECG signal and the PCG mel-spectrogram (e.g., the positional embeddings for the ECG signal may be relative to the other segments of the ECG signal and independent of the positional embeddings for the PCG mel-spectrogram). After the unmasked segments and patches are processed by a projection layer, the positional embeddings are added onto them and the result may be referred to as tokens.

After the masking is performed, the input sequence 308 may then comprise a subset of the tokens e.g., only tokens of the unmasked segments and patches, or the subset of tokens may be generated from the input sequence 308. The encoder 310 is configured to generate encoded tokens 312 from the input sequence 308, where the actual data processed through the blocks of the encoder 310 is the subset of tokens.

The encoder 310 may include a plurality of encoder transformer blocks (e.g., transformer layers) configured to process the subset of tokens. For example, the encoder 310 may include a plurality of transformer layers (e.g., 12) each comprising a multi-head self-attention layer and a position-wise feed-forward layer. In some examples, the feed-forward layer may have a feedforward dimension equal to 3072. The transformer may have an embedding dimension of 768. It is to be appreciated that the number of layers in the encoder, the feedforward dimension of the feed-forward layer, and the embedding dimension of the encoder are exemplary and other values are possible without departing from the scope of the disclosure. A first encoder block may process the subset of tokens and the features output by the first encoder block may be processed by a second encoder block, the features output by the second encoder block may be processed by a third encoder block, etc. The output of the final encoder block is the encoded tokens 312. The encoded tokens 312 may be enriched embedding vectors. The enriched embedding vectors may include the sequence of embedding vectors enriched with information that, over the course of training, is helpful for performing a target task. For training of the foundation model, the target task may be reconstructing the original (e.g., unmasked) ECG signal and original (e.g., unmasked) PCG mel-spectrogram. Thus, the information may include information helpful for predicting the ECG segments and PCG mel-spectrogram patches that are masked based on the unmasked ECG segments and PCG mel-spectrogram patches.

The encoded tokens 312 are passed to the decoder 316. Before the encoded tokens 312 are passed to the decoder 316, mask tokens are inserted into the encoded tokens 312 in place of the segments and patches that were masked to form a full set of tokens 314. As explained previously, the subset of tokens includes position embeddings to retain the positional (e.g., spatial-temporal) relationship among the segments and patches. The segments/patches that were masked may be reflected in the full set of tokens 314 via the mask tokens which also include positional embeddings (shown in gray in FIG. 3).

The decoder 316 may include a plurality of decoder transformer blocks configured to process the full set of tokens 314 in order to output an output sequence 318. For example, the decoder may include a plurality of transformer layers (e.g., 4) each comprising a multi-head self-attention layer and a position-wise feed-forward layer. In some examples, the feed-forward layer may have a feedforward dimension equal to 1536. The transformer may have an embedding dimension of 384. It is to be appreciated that the number of layers in the decoder, the feedforward dimension of the feedforward layer, and the embedding dimension of the decoder are exemplary and other values are possible without departing from the scope of the disclosure. The output sequence 318 may be a sequence of vectors of pixel values each representing an ECG segment or a PCG mel-spectrogram patch that can be assembled into a reconstructed training data input set 320 (e.g., a reconstructed ECG signal and reconstructed PCG mel-spectrogram). The decoder 316 has final linear prediction layers which take the output of the sequence of transformer blocks of the decoder and make predictions for the masked patches and/or segments. Separate linear prediction layers are used for the tokens corresponding to the PCG and ECG signals, e.g., the decoder may include two linear prediction layers, one for the ECG signal and one for the PCG signal.

The reconstructed training data input set 320 may be compared to the original (e.g., unmasked) ECG signal and PCG mel-spectrogram (e.g., used to create the training data input set 302) in order to calculate a loss function that may be applied to update the encoder 310 and decoder 316. For example, a mean squared error (MSE) or another loss function may be calculated between the reconstructed training data input set 320 and the original ECG signal and PCG mel-spectrogram in image space (e.g., pixel space). In some examples, the loss function may only be calculated on the masked patches and segments. The loss function may be used to update the encoder and decoder (e.g., adjust the weights/hyper-parameters of each of the encoder and decoder). In some examples, a stochastic gradient descent method (e.g., an AdamW optimizer) may be used to adjust the weights of the transformer layers of the encoder and the decoder in order to minimize the loss function, which may be a sum of the reconstruction errors summed over all input signals.

It is to be appreciated that FIG. 3 shows a single training data input set being used to perform one iteration of updating the encoder 310 and decoder 316 during training. A plurality of training data input sets may be used to fully train the foundation model, such as 100,000 or more training data input sets. Once trained, the encoder 310 may be fine-tuned to generate one or more specialized models, as explained below.

In some examples, the process of masking the ECG segments and PCG mel-spectrogram patches may include generating a token (via linear projection and added positional embedding) for every ECG segment and PCG mel-spectrogram of the original ECG signal and PCG mel-spectrogram. The tokens may then be randomly shuffled and a proportion of the shuffled tokens (e.g., the last 25% or the last 50%) may be removed to create the subset of tokens that is processed via the encoder transformer blocks. After encoding (e.g., after the subset of tokens have been processed via the encoder transformer blocks to form encoded tokens), a list of mask tokens (each corresponding to a token that was removed prior to processing via the encoder) is appended to the list of encoded tokens and the full list of tokens is unshuffled (e.g., via inverting the random shuffle operation) and positional embeddings applied. The unshuffled full list of tokens may be processed via the decoder transformer blocks.

FIG. 4 schematically shows an example process 400 for fine-tuning a foundation model to form a specialized model according to embodiments of the present disclosure. It is to be appreciated that the untrained or partially trained foundation model may include an encoder and a decoder (e.g., encoder 310 and decoder 316), while the fully trained foundation model may only include the trained encoder (e.g., the encoder 310 after training). Process 400 may be carried out by data processing system 202 using training data 216 according to instructions stored in training module 208.

Process 400 includes processing of the training data to form training data input sets. FIG. 4 shows an example of a training data input set 402. The training data input set 402 may be similar to the training data input set 302, in that the training data input set 402 may include a pair of synchronized ECG and PCG signals, with the PCG signal processed into a PCG mel-spectrogram. The ECG signal may be partitioned into segments and the PCG mel-spectrogram may be partitioned into patches. Thus, as shown in FIG. 4, the training data input set 402 may include an ECG signal 404 and (a grayscale representation of) a PCG mel-spectrogram 406. However, unlike the training data input set 302, the training data input set 402 may be labeled (e.g., by an expert) to specify whether or not the patient from which the training data input set 402 was collected exhibited a particular condition and/or whether or not the training data input set 402 was formed from high quality PCG and ECG signals or at least one of the PCG and ECG signal was low quality. For example, if the foundation model is to be fine-tuned in order to generate a specialized model trained to classify input data (e.g., ECG and PCG signals) as either normal or indicative of atrial fibrillation, the training data input set 402 may be labeled as "abnormal" or "atrial fibrillation" if the expert/annotator was able to confirm the patient exhibited atrial fibrillation, while the training data input set 402 may be labeled as "normal" or "no atrial fibrillation" if the expert/annotator was able to confirm the patient did not exhibit atrial fibrillation. In another example, if the foundation model is to be fine-tuned in order to evaluate PCG and ECG signal quality, the training data input set 402 may be labeled as "high quality" if the expert/annotator determined both the ECG signal and PCG signal were high quality (or the accelerometer data confirms the stethoscope was not moving during signal capture), while the training data input set 402 may be labeled as "low quality" if the expert/annotator determined one or both of the ECG signal and PCG signal were low quality (or the accelerometer data confirms the stethoscope was moving during signal capture). Thus, the training data input set 402 may further include a label 405.

The training data input set 402 is processed into an input sequence 408 that includes the segments and patches of the training data input set 402. It is to be appreciated that the input sequence 408 includes all the segments of the ECG signal and all the patches of the PCG mel-spectrogram, and no masking occurs during fine-tuning of the foundation model. The input sequence 408 may be used to train an encoder 410 and a classification head 414. The encoder 410 is configured to generate encoded tokens 412 from the input sequence 408. The encoder 410 may be the encoder 310 after training and validation. The encoder 410 may be configured to linearly project the segments/patches of the input sequence 408 and adding positional embeddings, as explained above with respect to FIG. 3, and output the encoded tokens 412 from the input sequence 408. As explained above, the encoded tokens 412 may be enriched embedding vectors. The enriched embedding vectors may include the set of tokens (e.g., embedding vectors) enriched with information that, over the course of training, is helpful for performing a target task. Because the encoder 410 was initially trained on a target task of reconstructing the original (e.g., unmasked) ECG signal and original (e.g., unmasked) PCG mel-spectrogram, the enriched embedding vectors (e.g., the encoded tokens) initially output by the encoder 410 may include information helpful for predicting neighboring ECG segments and PCG mel-spectrogram patches.

In some examples, this information (e.g., the information contained in the encoded tokens) may be used by the classification head 414 to predict if the training data input set 402 was obtained from a patient exhibiting the particular patient condition (e.g., atrial fibrillation). In other examples, this information may be used by the classification head 414 to identify a signal quality of the training data input set 402. As such, the encoded tokens 412 output by the encoder 410 may be passed to the classification head 414 and entered as input to the classification head 414. The classification head 414 is configured to convert the sequential output of the encoder 410 (e.g., the encoded tokens 412) into a classification result. The classification head 414 may be a fully connected neural network, at least in some examples. Thus, the classification head 414 may be a linear layer that takes in the pooled output of the features coming out from the encoder component (e.g., the encoded tokens). The input dimension of the tensor feeding into the classification head 414 may be equal to the encoder embedding dimension and the size of the output of the classification head 414 may be equal to the number of classes for the classification task (which in the example shown in FIG. 4 is two classes, normal and abnormal).

In some examples, the classification head 414 may be configured to output conditional probabilities of the training data input set 402 belonging to each of a plurality of classes, such as normal and abnormal (e.g., exhibiting atrial fibrillation). Thus, the classification head 414 may output a conditional probability for a first class 416 reflecting the likelihood the training data input set 402 was collected from a normal patient and a conditional probability for a second class 418 reflecting the likelihood the training data input set 402 was collected from an abnormal patient. In other examples, the classification head 414 may be configured to simply output an indication of whether the training data input set 402 was collected from a normal patient or an abnormal patient (e.g., the output from the classification head 414 may be an indication of the first class 416 or an indication of the second class 418). In some examples, classification head 414 may be trained to output conditional probabilities or another type of output for more than two classes (e.g., normal, atrial fibrillation, and low ejection fraction). In still further examples, the classification head 414 may be trained to output an indication (e.g., a conditional probability) of whether the training data input set 402 includes high or low quality ECG and PCG signals. While some training data input sets may include a high quality PCG signal and a low quality ECG signal (e.g., owing to the signals being collected over a shirt and thus no or low quality ECG signals being captured) or vice versa, the classification head 414 may only be trained to determine if both the ECG signal and the PCG signal are high quality, with either of the signals being low quality warranting an indication of low quality. In other examples, the classification head 414 may be trained to output a separate indication of the quality of each of the ECG signal and the PCG signal.

The output of the classification head 414 may be compared to the label 405 in order to calculate a loss function that is used to update the classification head 414 and the encoder 410 using a stochastic gradient decent algorithm (e.g., AdamW optimizer). In some examples, the loss function may be categorical cross-entropy with label smoothing. Further, the weights of the classification head and the transformer layers of the encoder may be updated simultaneously. In some examples, only a few layers at the end of the sequence of transformer layers in the encoder may be tuned during the fine-tuning phase. The number of transformer layers in the encoder that are unfrozen (e.g., adjusted) during the fine-tuning phase may be adapted/tuned based on the classification task.

Thus, a foundation model may be trained as described above using unlabeled, synchronized pairs of ECG and PCG signals collected from patients by clinicians during regular clinical practice, for example, and stored as training data (e.g., in a database). To train the foundation model, each unlabeled, synchronized pair of ECG and PCG signals may be processed to convert the PCG signal to a mel-spectrogram representation. The ECG signal (which may be a single-lead signal, a two-lead signal, a three-lead signal, or more leads) and the PCG mel-spectrogram may be partitioned into segments and patches, respectively. Random segments/patches of the ECG signal and PCG mel-spectrogram are masked and the foundation model is trained to simultaneously reconstruct the original ECG signal and the PCG mel-spectrogram based on the segments/patches that were not masked. During the training phase, the foundation model is exposed to vast amounts (usually in the order of hundreds of thousands) of unlabeled, synchronized pairs of ECG and PCG signals.

In some examples, the foundation model may be trained with training data that only includes single-lead ECG signals (and not ECG signals from 2, 3, or more leads), trained with training data that only includes two-lead ECG signals (and not ECG signals from 3, 4, or more leads), trained with training data that only includes three-lead ECG signals, or a different number of leads. In this way, a given foundation model may be specific to an ECG configuration, and multiple foundation models may be trained such that a first model is specific to single-lead ECG signals, a second model is specific to three-lead ECG signals, etc. A benefit of training separate foundation models (e.g., one for each ECG configuration) is that each foundation model may more accurately describe/understand the relationship among ECG features for that number of leads, leading to more accurate specialized models. Each foundation model may be fine-tuned as described above so that, for example, a first specialized model is produced that is trained to identify a patient condition (e.g., low ejection fraction) using only single-lead ECG signals and a second specialized model is produced that is trained to identify the patient condition using three-lead ECG signals. However, training and deploying multiple specialized models may be computationally expensive. In such examples, the benefit of training the foundation model and hence the specialized model to accept single-lead ECG signals only is that if, during inference, a patient ECG signal is a three-lead ECG signal, signals from two of the leads may be discarded and the patient ECG signal may still be used. However, conversely, if the specialized model is trained to accept three-lead ECG signals and during inference a single-lead patient ECG signal is used as input, the specialized model may still generate an output using only the single-lead patient ECG signal, but the output may be of lower confidence.

The foundation model may be composed of transformer blocks. During training, there is an encoder part and a decoder part of the foundation model. The encoder part processes only the unmasked ECG segments and unmasked patches of the PCG mel-spectrogram. The decoder part takes the output from the encoder and combines the output from the encoder with mask tokens in place of the segments/patches that were masked and then reconstructs the original ECG signal and PCG mel-spectrogram. In this way, the foundation model is trained to jointly analyze/process ECG segments and patches of the PCG mel-spectrogram. The foundation model thus learns complex intra-dependencies between ECG segments or patches of the PCG mel-spectrogram as well as interdependencies across ECG segments and patches of the PCG mel-spectrogram.

After training of the foundation model, the decoder part is discarded and a classification head is added following the encoder part of the pre-trained foundation model. Thereafter, upon processing of labeled data, the classification head is trained simultaneously with the encoder part of the pre-trained foundation model to detect cardiovascular conditions such as cardiac murmurs, atrial fibrillation, low ejection fraction, and pulmonary hypertension. During the fine-tuning phase, the specialized model (encoder and classification head) is exposed to a smaller number of pairs of ECG and PCG signals (e.g., 500 pairs) with labels corresponding to the abnormality present in the subject from whom the signals were collected. The labels may be obtained from simultaneously taken echocardiograms or from a panel of human annotators who label the ECG signals or heart sounds (PCG).

The result of the fine-tuning process is a specialized model that can take as input synchronized pairs of ECG and PCG signals from a subject and make predictions for the presence of cardiovascular abnormalities like cardiac murmurs, atrial fibrillation, low ejection fraction, and pulmonary hypertension. Using synchronously captured ECG and PCG data as inputs to train the foundation model and fine-tune the foundation model into the specialized model allows the models to learn patterns in the timing of electrical activities of the heart relative to the timing of mechanical activities of the heart (as manifested in the heart sounds via PCG). Thereby, any deviation in the normal patterns of relative timings of electrical and mechanical activity may be used to classify a subject as being in an abnormal state.

Figure 5:
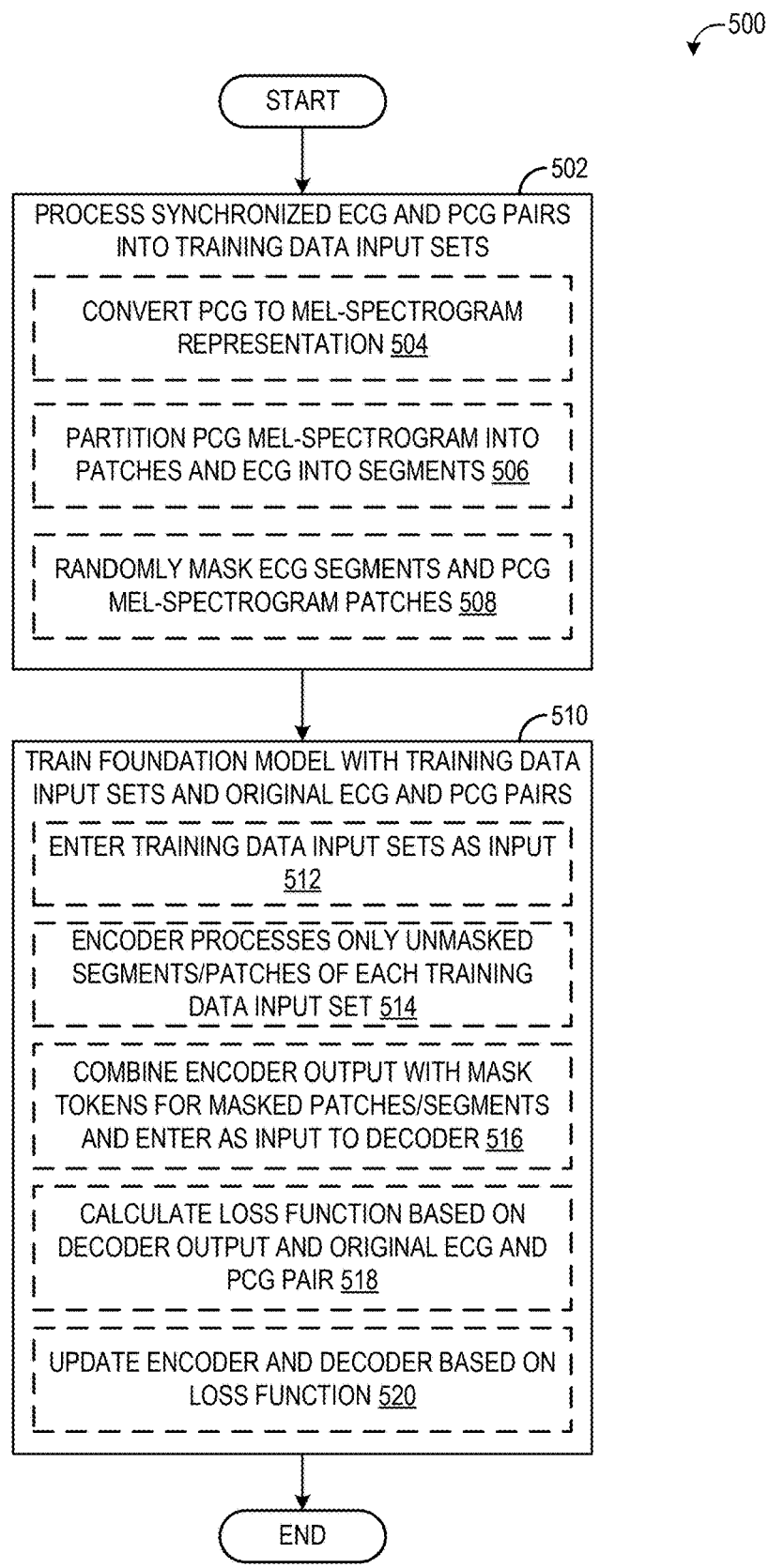
FIG. 5 is a flow chart illustrating an example method for training a foundation model.

FIG. 5 is a flow chart illustrating a method 500 for training a foundation model, such as foundation model 210. Method 500 may be carried out by a computing system, such as data processing system 202, according to instructions stored in memory (e.g., as part of training module 208) and executed by one or more processors. At 502, method 500 includes processing synchronized ECG and PCG pairs into training data input sets. The synchronized ECG and PCG pairs may be obtained from a database (e.g., the database storing training data 216) or another suitable source and may be collected/recorded with digital stethoscopes (e.g., stethoscope 100). The ECG signal and the PCG signal in a given synchronized ECG and PCG pair may be collected from the same patient at the same time. Each synchronized ECG and PCG pair may be unlabeled, in that no external analysis has been performed on the synchronized ECG and PCG pair (or the patient from which the synchronized ECG and PCG pair was collected) to determine if the synchronized ECG and PCG pair (or the patient) exhibits features indicative of a particular patient condition/abnormality. However, it is to be appreciated that labeled, synchronized ECG and PCG pairs may be included in the training data input sets for training the foundation model; in such examples, the labels may be ignored during training of the foundation model. The synchronized ECG and PCG pairs may be collected from any location on the body (e.g., relative to the heart) and it is to be appreciated that the training data input sets may include ECG and PCG pairs collected from a range of collection locations. However, many patient exams may include ECG and PCG signal collection at a few standard locations relative to the heart and thus the training data input sets may predominantly include ECG and PCG pairs collected from those standard locations. Further, the foundation model may be trained with only training data input sets that include single-lead ECG signals, or only two-lead ECG signals, or only three-lead ECG signals, etc. In other examples, the foundation model may be trained with training data input sets that include different lead ECG signals (e.g., some single-lead ECG signals, some three-lead ECG signals, etc.).

Processing the synchronized ECG and PCG pairs into training data input sets may include converting each PCG signal (e.g., of each synchronized ECG and PCG pair) to a mel-spectrogram representation, as indicated at 504. Converting a PCG signal to a mel-spectrogram representation may include performing a Fast Fourier Transform (FFT) on overlapping windowed segments of the PCG signal to produce a spectrogram (e.g., with the y axis converted to log scale and the decibels/log scale of the amplitude represented by color) and then converting the frequencies of the spectrogram to the mel scale (e.g., with 128 mel-bands) to generate the mel-spectrogram. The PCG signal may be collected at a sampling rate of 4000 Hz, in some examples. Further, the length of each FFT window may be 512 samples with a hop-length (e.g., number of samples between successive frames) of 64 and the frequency range of the mel-spectrogram may be 0-800 Hz.

Processing the synchronized ECG and PCG pairs into training data input sets may further include partitioning each PCG mel-spectrogram into patches and partitioning each ECG signal into segments, as indicated at 506. As explained above with respect to FIG. 3, the PCG mel-spectrogram and ECG signal of a given pair may be divided into patches and segments, respectively. The ECG signal may be divided into segments that are non-overlapping windows having the same time duration (e.g., 0.1 seconds, 0.2 seconds), with each ECG segment including the entire ECG signal over that time duration (e.g., all voltage values collected during the time duration). Each PCG mel-spectrogram may be partitioned into patches including only a portion (e.g., a particular range) of the audio frequency collected during the time duration (and whatever audio amplitude occurred during that time duration at the particular frequency range). As explained above, the PCG mel-spectrogram patches may be 16×16 pixels, but other patch sizes are possible. In some examples, different ECG-PCG pairs in the training data may have different overall durations. For example, a first ECG-PCG pair may have an overall duration of 15 seconds while a second ECG-PCG pair may have an overall duration of 20 seconds. Once partitioned into segments and patches, each segment and patch may have the same duration, resulting in some ECG-PCG pairs having more segments/patches than other ECG-PCG pairs.

Processing the synchronized ECG and PCG pairs into training data input sets may further include randomly masking the ECG segments and the PCG mel-spectrogram patches, as indicated at 508. For a given ECG-PCG pair, at least one ECG segment and at least one PCG mel-spectrogram patch may be masked. In some examples, the random masking may include masking 30% of the segments and 70% of the patches, or masking a different percentage of segments and/or patches.

At 510, method 500 includes training the foundation model with the training data input sets and original ECG-PCG pairs. Training the foundation model may include entering the training data input sets (e.g., the masked ECG-PCG mel-spectrogram pairs) as input (e.g., to the encoder of the foundation model), as indicated at 512. As indicated at 514, the encoder processes only the unmasked segments/patches of each training data input set. As explained above with respect to FIG. 3, the encoder may generate embedding vectors/tokens from each sequence of unmasked segments/patches and generate the encoder output from the embedding vectors (e.g., the encoded tokens described above with respect to FIG. 3). As indicated at 516, the encoder output is combined with mask tokens for the masked segments/patches and entered as input to a decoder (e.g., decoder 316) of the foundation model. The decoder is configured to process the encoder output/mask tokens to generate an output sequence that can be used to reconstruct the original ECG and PCG pair (e.g., the ECG signal and PCG mel-spectrogram before masking). The output from the decoder (e.g., the reconstructed ECG signal and PCG mel-spectrogram) may be compared to the original ECG signal and PCG mel-spectrogram in order to calculate a loss function, as indicated at 518, and the encoder and decoder may each be updated based on the loss function, as indicated at 520. It is to be appreciated that in some examples, as explained above with respect to FIG. 3, the training data input sets before masking may be entered as input to the foundation model (e.g., to the encoder), and the encoder may generate the tokens (e.g., processing the input segments/patches through a projection layer and then adding positional embeddings) and then the generated tokens may be masked with only the unmasked tokens processed further through the encoder.

Figure 6:
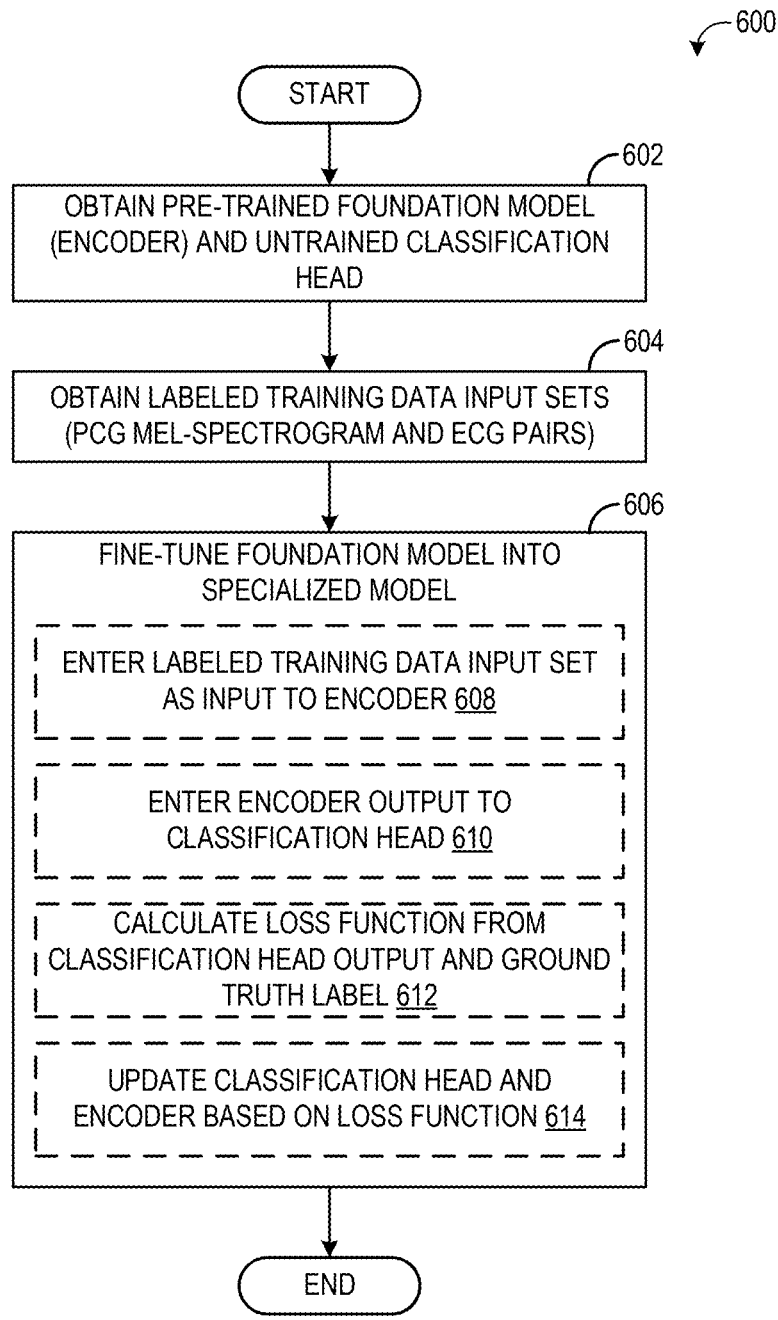
FIG. 6 is a flow chart illustrating an example method for training a specialized model from a trained foundation model.

Once the foundation model is trained (e.g., once a predetermined number of synchronous ECG-PCG pairs have been processed through the foundation model with the encoder and decoder updated each time a synchronous ECG-PCG pair is processed through the foundation model), the trained encoder may be fine-tuned along with a classification head to classify synchronous ECG-PCG pairs as normal or indicative of a specific patient condition or as high quality or low quality. FIG. 6 is a flow chart illustrating a method 600 for training a specialized model, such as specialized model 212, utilizing a trained foundation model. Method 600 may be carried out by a computing system, such as data processing system 202, according to instructions stored in memory (e.g., as part of training module 208) and executed by one or more processors.

At 602, method 600 includes obtaining a pre-trained foundation model (e.g., a pre-trained encoder) and an untrained classification head. The pre-trained foundation model may be the encoder of the foundation model trained according to method 500 of FIG. 5 (e.g., the encoder 410, which is the encoder 310 after training). At 604, method 600 includes obtaining labeled training data input sets. The labeled training data input sets may include ECG and PCG mel-spectrogram pairs, which may be generated from synchronized ECG-PCG signal pairs as explained above with respect to FIG. 5 (e.g., the PCG signal may be converted to a PCG mel-spectrogram and the ECG signal and PCG mel-spectrogram partitioned into segments and patches, respectively). Each labeled training data input set may include a label indicating whether or not the patient from which the ECG-PCG signal pair was collected has a confirmed patient cardiovascular condition (e.g., murmur, atrial fibrillation). Each labeled training data input set used to fine-tune the foundation model into the specialized model may include a label indicating the respective patient is normal (e.g., does not exhibit the condition) or abnormal (e.g., does exhibit the condition). In some examples, each labeled training data input set labeled as abnormal may be labeled as abnormal for the same condition, e.g., each "abnormal" patient may have a diagnosis of atrial fibrillation if the specialized model is to be deployed to detect atrial fibrillation, or each "abnormal" patient may have a diagnosis of low ejection fraction if the specialized model is to be deployed to detect low ejection fraction. In other examples, a portion of the labeled training data input sets may be labeled "normal" corresponding to the patients from which the signals were collected being determined not have one of a plurality of patient conditions, and the remaining labeled training data input sets may be labeled as whatever condition, of the plurality of patient conditions, the respective patients from which the signals were collected were determined to have exhibited. For example, the labeled training data input sets collected from patients having atrial fibrillation may be labeled as "atrial fibrillation" and the labeled training data input sets collected from patients having low ejection fraction may be labeled as "low ejection fraction." Additionally or alternatively, each labeled training data input set may include a label indicating whether the ECG-PCG signal pair is high quality or low quality.

The labels of the labeled training data input set may be generated manually (e.g., by experts reviewing each patient's medical history) and/or automatically (e.g., by pulling findings saved as part of an imaging report/exam for each patient). It is to be appreciated that for at least some patient conditions (e.g., low ejection fraction), the patient condition is not traditionally diagnosed via ECG and/or PCG signals and experts cannot practically identify the presence of the patient condition from the ECG and/or PCG signals. In such examples, the determination of whether or not a patient exhibits a given patient condition may be based on external patient information, such as imaging data (e.g., echocardiograms), invasively measured pulmonary artery pressure, and the like.

At 606, the foundation model is fine-tuned into a specialized model using the labeled training data input sets. Fine-tuning the foundation model into the specialized model may include entering a labeled training data input set as input to the encoder, as indicated at 608. The encoder may be configured to generate embedding vectors/tokens including positional embeddings from the labeled training data input set and process the embedding vectors to generate encoder output (such as the encoded tokens 412 of FIG. 4). During fine-tuning to produce the specialized model, an entirety of the segments and patches of the labeled training data input sets may be processed by the encoder (e.g., none of the segments or patches are masked). As indicated at 610, the encoder output is entered as input to a classification head, such as classification head 414, which is configured to process the encoder output to generate classification output. The classification output may include a conditional probability or other indication of whether the patient from which the labeled training data input set was collected is normal, abnormal, or exhibits a particular patient condition. Additionally or alternatively, the classification output may include a conditional probability or other indication of whether the ECG and PCG signal of the labeled training data input set are high quality or low quality. As indicated at 612, a loss function is calculated based on the output from the classification head and the ground truth label (e.g., the label of the labeled training data input set), and the classification head and the encoder are updated based on the loss function, as indicated at 614. The fine-turning process is repeated for each labeled training data input set, to form a trained specialized model specifically configured to classify synchronous ECG-PCG pairs as normal or abnormal for one or more patient conditions.

Figure 7:
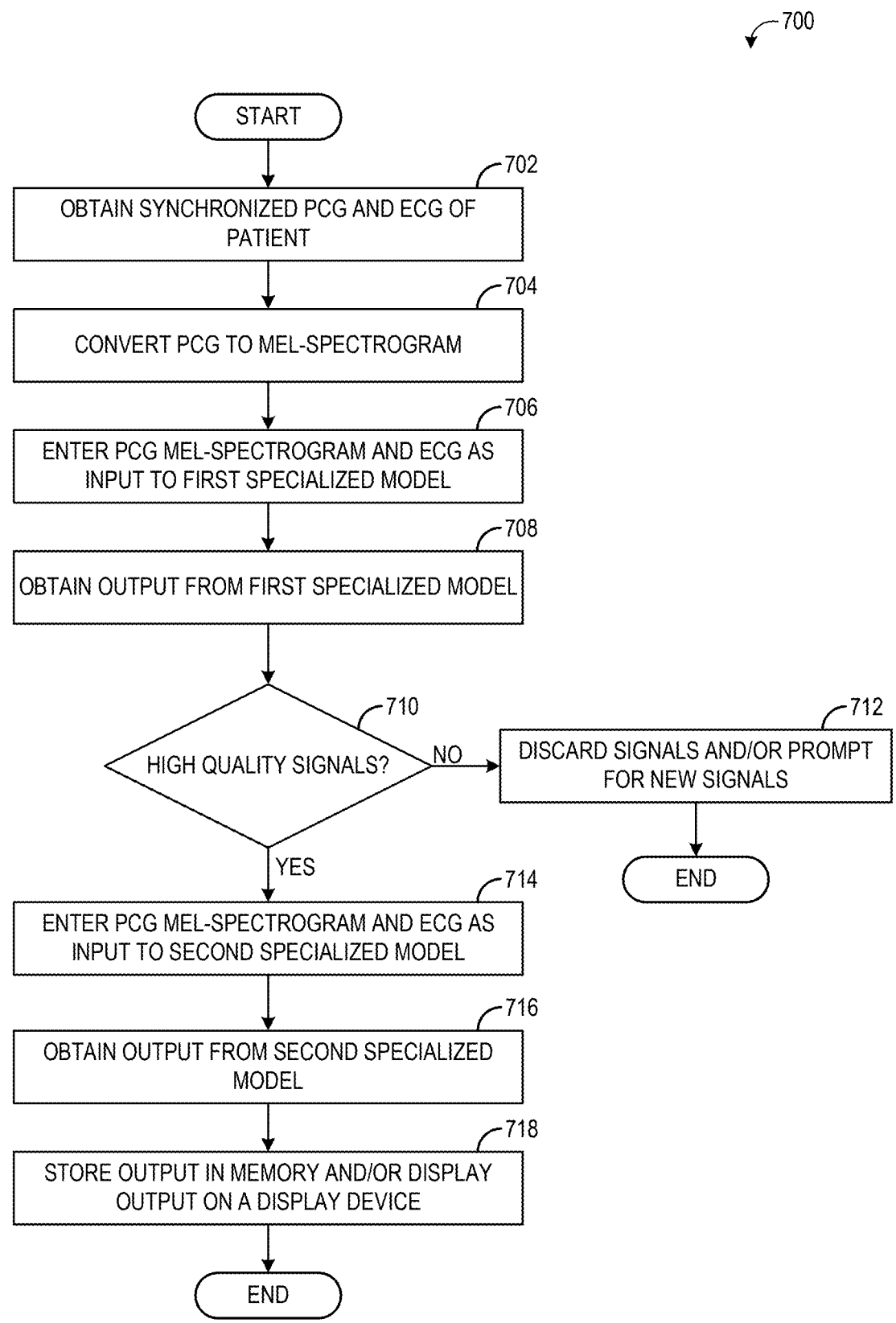
FIG. 7 is a flow chart illustrating an example method for deploying a trained specialized model to detect a patient condition.

FIG. 7 is a flow chart illustrating a method 700 for deploying one or more trained specialized models, such as specialized model 212. Method 700 may be carried out by a computing system, such as data processing system 202, according to instructions stored in memory (e.g., as part of inference module 214) and executed by one or more processors. In some examples, method 700 may be carried out by a computing device other than data processing system 202, such as computing device 140.

At 702, method 700 includes obtaining a synchronized ECG and PCG signal pair of a patient (also referred to as a patient ECG-PCG signal pair). The synchronized ECG and PCG signal pair may be collected with a digital stethoscope (e.g., stethoscope 100). The synchronized ECG and PCG signal pair may be collected with the digital stethoscope at any location on the patient relative to a heart of the patient, in some examples. In other examples, the synchronized ECG and PCG signal pair may be collected with the digital stethoscope at one of a plurality of standard positions, and the clinician operating the digital stethoscope during signal capture may be instructed on where to position the digital stethoscope (e.g., via a user interface). At 704, method 700 includes converting the PCG signal of the synchronized ECG and PCG signal pair to a PCG mel-spectrogram, which may be carried out as explained above with respect to FIG. 5. At 706, the PCG mel-spectrogram and the ECG signal are entered as input to a first specialized model (which may be trained according to method 600 of FIG. 6). Specifically, the PCG mel-spectrogram may be partitioned into patches and the ECG signal may be partitioned into segments to form an input sequence (similar to input sequence 408) that is passed to the encoder of the trained first specialized model (e.g., the encoder 410 after training). The encoder is trained to generate embedding vectors/tokens from the input sequence and process the embedding vectors to form encoded tokens, which are then entered as input to a classification head of the first specialized model (e.g., classification head 414 after training). The classification head is trained to process the encoded tokens to generate a classification output, and thus at 708, method 700 includes obtaining an output (e.g., a classification output) from the first specialized model. In the example of the first specialized model, the classification output may indicate the quality level of the synchronous ECG-PCG signal pair, such as an indication that the synchronous ECG-PCG signal pair is high quality or low quality. A high quality classification may indicate that the synchronous ECG-PCG signal pair is suitable for processing via a second specialized model, explained in more detail below. A low quality classification may indicate that the synchronous ECG-PCG signal pair is not suitable for processing via a second specialized model, due to noise in the synchronous ECG-PCG signal pair. In some examples, the first specialized model may be selected from among two or more first specialized models based on the ECG configuration of the synchronous ECG-PCG signal pair (e.g., how many leads are included in the ECG signal). For example, the ECG signal may be a single-lead ECG signal and thus the first specialized model may be selected due to the first specialized model being trained specifically on single-lead ECG signals. In other examples, if the ECG signal of the synchronous ECG-PCG signal pair includes multiple lead signals, one or more lead signals may be dropped so that only a single-lead ECG signal is entered as input to the first specialized model.

Thus, at 710, method 700 includes determining if the output from the first specialized model indicates that the synchronous ECG-PCG signal pair is high quality (e.g., both signals of the synchronous ECG-PCG signal pair are high quality). If not, method 700 proceeds to 712 to discard the synchronous ECG-PCG signal pair and/or prompt a user to collect/enter a new synchronous ECG-PCG signal pair. Method 700 then ends.

If the output from the first specialized model indicates that the synchronous ECG-PCG signal pair is high quality, method 700 proceeds to 714 to enter the PCG mel-spectrogram and ECG signal as input to a second specialized model. The PCG mel-spectrogram may be partitioned into patches and the ECG signal may be partitioned into segments to form an input sequence (similar to input sequence 408), as explained above, that is passed to the encoder of the trained second specialized model (e.g., the encoder 410 after training). The encoder is trained to generate embedding vectors/tokens from the input sequence and process the embedding vectors to form encoded tokens, which are then entered as input to a classification head of the second specialized model (e.g., classification head 414 after training). The classification head is trained to process the encoded tokens to generate a classification output that indicates whether or not the synchronous ECG-PCG signal pair is indicative of (e.g., collected from a patient that exhibits) a specified patient condition such as atrial fibrillation. In some examples, the second specialized model may be selected from among two or more second specialized models based on the ECG configuration of the synchronous ECG-PCG signal pair (e.g., how many leads are included in the ECG signal). For example, the ECG signal may be a single-lead ECG signal and thus the second specialized model may be selected due to the second specialized model being trained specifically on single-lead ECG signals. In other examples, if the ECG signal of the synchronous ECG-PCG signal pair includes multiple lead signals, one or more lead signals may be dropped so that only a single-lead ECG signal is entered as input to the second specialized model.

Thus, at 716, method 700 includes obtaining output from the second specialized model (e.g., the classification output from the classification head) and, at 718, storing the output in memory and/or displaying the output on a display device. For example, a notification indicating whether the ECG-PCG signal pair is normal or abnormal (suggesting that the patient does not have the patient condition or suggesting that the patient does have the patient condition, respectively) may be output on a display device, such as a display device of computing device 140. In some examples, the output from the specialized model may be an indication of whether the patient is normal or has one of a plurality of patient conditions, such as atrial fibrillation and low ejection fraction.

A technical effect of generating a classification output based on an ECG signal and a PCG mel-spectrogram of a patient with a trained specialized model that is trained with labeled ECG and PCG signal pairs using a foundation model trained with unlabeled ECG and PCG signal pairs is that the specialized model may be trained with a smaller number of labeled ECG and PCG signal pairs relative to models that do not incorporate a foundation model, which may simplify training of the specialized model. The foundation model may take advantage of existing unlabeled ECG and PCG signal pairs to form the basis for one or more specialized models, and as such, another technical effect is that multiple different specialized models (e.g., trained to generate different classification outputs) may be generated with a single foundation model, thereby lowering processing and memory demands of generating the specialized models.

The disclosure also provides support for a method, comprising: obtaining an ECG signal and a PCG signal from a patient, wherein the ECG signal and PCG signal are synchronized, converting the PCG signal to a PCG mel-spectrogram, entering the ECG signal and the PCG mel-spectrogram as input to a trained specialized model configured to output a classification output based on the ECG signal and the PCG mel-spectrogram, the trained specialized model trained with labeled ECG and PCG signal pairs using a foundation model trained with unlabeled ECG and PCG signal pairs, and storing the classification output in memory and/or displaying the classification output on a display device. In a first example of the method, the classification output includes an indication of whether or not the patient exhibits a patient condition. In a second example of the method, optionally including the first example, the patient condition includes murmur, atrial fibrillation, low ejection fraction, or pulmonary hypertension. In a third example of the method, optionally including one or both of the first and second examples, entering the ECG signal and the PCG mel-spectrogram as input to the trained specialized model comprises partitioning the ECG signal into segments and partitioning the PCG mel-spectrogram into patches to form an input sequence, and entering the input sequence as input to the trained specialized model. In a fourth example of the method, optionally including one or more or each of the first through third examples, entering the input sequence as input to the trained specialized model comprises entering the input sequence as input to an encoder of the trained specialized model, the encoder trained to output encoded tokens based on the input sequence, and entering the encoded tokens as input to a classification head trained to output the classification output based on the encoded tokens. In a fifth example of the method, optionally including one or more or each of the first through fourth examples, the encoder and the classification head are trained with the labeled ECG and PCG signal pairs. In a sixth example of the method, optionally including one or more or each of the first through fifth examples, the encoder of the trained specialized model is a fine-tuned version of a pre-trained encoder, the pre-trained encoder trained with the unlabeled ECG and PCG signal pairs and a decoder. In a seventh example of the method, optionally including one or more or each of the first through sixth examples, the classification output includes an indication of a quality level of the ECG signal and the PCG signal.

The disclosure also provides support for a data processing system, comprising: memory storing instructions and a trained specialized model, the trained specialized model trained with labeled, synchronized ECG and PCG signal pairs using a foundation model trained with unlabeled, synchronized ECG and PCG signal pairs, and one or more processors configured to execute the instructions to: obtain a patient ECG signal and a patient PCG signal from a patient, convert the patient PCG signal to a PCG mel-spectrogram, enter the patient ECG signal and the PCG mel-spectrogram as input to the trained specialized model, the trained specialized model configured to output a classification output based on the patient ECG signal and the PCG mel-spectrogram, and store the classification output in memory and/or display the classification output on a display device. In a first example of the system, the classification output includes an indication of whether or not the patient exhibits a patient condition. In a second example of the system, optionally including the first example, the patient condition includes murmur, atrial fibrillation, low ejection fraction, or pulmonary hypertension. In a third example of the system, optionally including one or both of the first and second examples, entering the patient ECG signal and the PCG mel-spectrogram as input to the trained specialized model comprises partitioning the patient ECG signal into segments and partitioning the PCG mel-spectrogram into patches to form an input sequence, and entering the input sequence as input to the trained specialized model. In a fourth example of the system, optionally including one or more or each of the first through third examples, entering the input sequence as input to the trained specialized model comprises entering the input sequence as input to an encoder of the trained specialized model, the encoder trained to output encoded tokens based on the input sequence, and entering the encoded tokens as input to a classification head trained to output the classification output based on the encoded tokens. In a fifth example of the system, optionally including one or more or each of the first through fourth examples, the encoder and the classification head are trained with the labeled, synchronized ECG and PCG signal pairs. In a sixth example of the system, optionally including one or more or each of the first through fifth examples, the encoder of the trained specialized model is a fine-tuned version of a pre-trained encoder, the pre-trained encoder trained with the unlabeled, synchronized ECG and PCG signal pairs and a decoder.

The disclosure also provides support for a method for generating a specialized model from a foundation model, comprising: training a transformer-based foundation model using a plurality of unlabeled training data input sets, each unlabeled training data input set comprising a first ECG signal and a first PCG mel-spectrogram, training the specialized model using a plurality of labeled training data input sets, each labeled training data input comprising a second ECG signal, a second PCG mel-spectrogram, and a label, and deploying the trained specialized model to detect a patient condition based on a patient ECG signal and a patient PCG signal. In a first example of the method, training the transformer-based foundation model using the plurality of unlabeled training data input sets comprises, for each unlabeled training data input set, partitioning the first ECG signal into segments and partitioning the first PCG mel-spectrogram into patches, processing a subset of the segments and a subset of the patches with an encoder to generate encoded tokens, combining the encoded tokens with a plurality of mask tokens to form a full set of tokens, and processing the full set of tokens with a decoder to generate a reconstructed ECG signal and PCG mel-spectrogram, wherein the plurality of mask tokens correspond to a remainder of the segments and the patches. In a second example of the method, optionally including the first example, training the transformer-based foundation model further comprises calculating a loss function based on the reconstructed ECG signal and PCG mel-spectrogram and the first ECG signal and the first PCG mel-spectrogram, and updating the encoder and the decoder based on the loss function. In a third example of the method, optionally including one or both of the first and second examples, training the specialized model using the plurality of labeled training data input sets comprises, for each labeled training data input set, partitioning the second ECG signal into segments and partitioning the second PCG mel-spectrogram into patches, processing an entirety of the segments and an entirety of the patches with the encoder to generate second encoded tokens, and processing the second encoded tokens with a classification head to generate a classification output. In a fourth example of the method, optionally including one or more or each of the first through third examples, training the specialized model further comprises calculating a loss function based on the classification output and the label, and updating the classification head and the encoder based on the loss function.

Certain adaptations and modifications of the described embodiments can be made. Therefore, the above discussed embodiments are considered to be illustrative and not restrictive. The present disclosure is not to be limited in scope by the specific embodiments described herein. Further example embodiments may also include all of the steps, features, and components referred to or indicated in this description, individually or collectively and any and all combinations or any two or more of the steps or features.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
obtaining an ECG signal and a PCG signal from a patient, wherein the ECG signal and PCG signal are synchronized;
converting the PCG signal to a PCG mel-spectrogram;
partitioning the ECG signal into segments and partitioning the PCG mel-spectrogram into patches;
forming an input sequence from the segments and the patches;
entering the input sequence as input to a trained specialized model configured to output a classification output based on the input sequence, the trained specialized model trained with labeled ECG and PCG signal pairs using a foundation model trained with unlabeled ECG and PCG signal pairs; and
storing the classification output in memory and/or displaying the classification output on a display device.

2. The method of claim 1, wherein the classification output includes an indication of whether or not the patient exhibits a patient condition.

3. The method of claim 2, wherein the patient condition includes murmur, atrial fibrillation, low ejection fraction, or pulmonary hypertension.

4. The method of claim 1, wherein each segment of the ECG signal spans a different time range of the ECG signal and includes the entire ECG signal over that time range, and wherein each patch includes a portion of a frequency range of the PCG mel-spectrogram over a time range of the PCG signal, such that the PCG mel-spectrogram is partitioned into rows and columns of patches.

5. The method of claim 1, wherein entering the input sequence as input to the trained specialized model comprises entering the input sequence as input to an encoder of the trained specialized model, the encoder trained to output encoded tokens based on the input sequence, and entering the encoded tokens as input to a classification head trained to output the classification output based on the encoded tokens.

6. The method of claim 5, wherein the encoder and the classification head are trained with the labeled ECG and PCG signal pairs.

7. The method of claim 6, wherein the labeled ECG and PCG signal pairs are used to further train a pre-trained encoder to form the encoder, the pre-trained encoder trained with the unlabeled ECG and PCG signal pairs and a decoder, wherein training the pre-trained encoder with the unlabeled ECG and PCG signal pairs and the decoder comprises, for each unlabeled ECG and PCG signal pair, converting the PCG signal to a mel-spectrogram, partitioning the ECG signal into segments and partitioning the mel-spectrogram into patches, processing a subset of the segments and a subset of the patches with the pre-trained encoder to generate encoded tokens, combining the encoded tokens with a plurality of mask tokens to form a full set of tokens, and processing the full set of tokens with the decoder to generate a reconstructed ECG signal and mel-spectrogram, and wherein the plurality of mask tokens correspond to a remainder of the segments and the patches.

8. The method of claim 1, wherein the trained specialized model is a first trained specialized model, and wherein the classification output includes an indication of a quality level of the ECG signal and the PCG signal, and further comprising, responsive to the quality level exceeding a threshold, entering the input sequence as input to a second trained specialized model configured to output a second classification output based on the input sequence, the second trained specialized model trained with further labeled ECG and PCG signal pairs using the foundation model.

9. A data processing system, comprising:
memory storing instructions and a trained specialized model, the trained specialized model trained with labeled, synchronized ECG and PCG signal pairs using a foundation model trained with unlabeled, synchronized ECG and PCG signal pairs, the foundation model including a pre-trained encoder that is pre-trained with the unlabeled, synchronized ECG and PCG signal pairs and a decoder, and the trained specialized model includes an encoder that comprises the pre-trained encoder that is further trained with the labeled, synchronized ECG and PCG signals pairs; and one or more processors configured to execute the instructions to:
- obtain a patient ECG signal and a patient PCG signal from a patient;
- convert the patient PCG signal to a PCG mel-spectrogram;
- enter the patient ECG signal and the PCG mel-spectrogram as input to the trained specialized model, the trained specialized model configured to output a classification output based on the patient ECG signal and the PCG mel-spectrogram; and
- store the classification output in memory and/or display the classification output on a display device.

10. The data processing system of claim 9, wherein the classification output includes an indication of whether or not the patient exhibits a patient condition.

11. The data processing system of claim 10, wherein the patient condition includes murmur, atrial fibrillation, low ejection fraction, or pulmonary hypertension.

12. The data processing system of claim 9, wherein entering the patient ECG signal and the PCG mel-spectrogram as input to the trained specialized model comprises partitioning the patient ECG signal into a plurality of segments and partitioning the PCG mel-spectrogram into a plurality of patches and forming an input sequence that includes the plurality of segments and the plurality of patches, and entering the input sequence as input to the trained specialized model.

13. The data processing system of claim 12, wherein entering the input sequence as input to the trained specialized model comprises entering the input sequence as input to the encoder of the trained specialized model, the encoder trained to output encoded tokens based on the input sequence, and entering the encoded tokens as input to a classification head trained to output the classification output based on the encoded tokens.

14. The data processing system of claim 13, wherein the encoder and the classification head are trained with the labeled, synchronized ECG and PCG signal pairs.

15. The data processing system of claim 14, wherein each unlabeled, synchronized ECG and PCG signal pair is processed to form a respective training data input set that includes a plurality of unmasked ECG segments and a plurality of unmasked PCG mel-spectrogram patches, each respective training data input set further processed to randomly mask a subset of ECG segments and a subset of PCG mel-spectrogram patches to form a respective masked training data input set, each respective masked training data input set configured to be entered as input to the pre-trained encoder, and the pre-trained encoder is pre-trained to reconstruct a respective training data input set from a corresponding masked training data input set.

16. A method for generating a specialized model from a foundation model, comprising:
- training a transformer-based foundation model using a plurality of unlabeled training data input sets, each unlabeled training data input set comprising a first ECG signal and a first PCG mel-spectrogram;
- training the specialized model using a plurality of labeled training data input sets, each labeled training data input comprising a second ECG signal, a second PCG mel-spectrogram, and a label; and
- deploying the trained specialized model to detect a patient condition based on a patient ECG signal and a patient PCG signal, including converting the patient PCG signal to a PCG mel-spectrogram, partitioning the patient ECG signal into a plurality of segments and partitioning the PCG mel-spectrogram into a plurality of patches, forming an input sequence that includes the plurality of segments and the plurality of patches, and entering the input sequence as input to the trained specialized model.

17. The method of claim 16, wherein training the transformer-based foundation model using the plurality of unlabeled training data input sets comprises, for each unlabeled training data input set, partitioning the first ECG signal into segments and partitioning the first PCG mel-spectrogram into patches, processing a subset of the segments and a subset of the patches with an encoder to generate encoded tokens, combining the encoded tokens with a plurality of mask tokens to form a full set of tokens, and processing the full set of tokens with a decoder to generate a reconstructed ECG signal and PCG mel-spectrogram, wherein the plurality of mask tokens correspond to a remainder of the segments and the patches.

18. The method of claim 17, wherein training the transformer-based foundation model further comprises calculating a loss function based on the reconstructed ECG signal and PCG mel-spectrogram and the first ECG signal and the first PCG mel-spectrogram, and updating the encoder and the decoder based on the loss function.

19. The method of claim 17, wherein training the specialized model using the plurality of labeled training data input sets comprises, for each labeled training data input set, partitioning the second ECG signal into segments and partitioning the second PCG mel-spectrogram into patches, processing an entirety of the segments and an entirety of the patches with the encoder to generate second encoded tokens, and processing the second encoded tokens with a classification head to generate a classification output.

20. The method of claim 19, wherein training the specialized model further comprises calculating a loss function based on the classification output and the label, and updating the classification head and the encoder based on the loss function.

* * * * *